US012124269B2

(12) United States Patent
Yang et al.

(10) Patent No.: US 12,124,269 B2
(45) Date of Patent: Oct. 22, 2024

(54) SYSTEMS AND METHODS FOR SIMULTANEOUS LOCALIZATION AND MAPPING USING ASYNCHRONOUS MULTI-VIEW CAMERAS

(71) Applicant: Aurora Operations, Inc., Pittsburgh, PA (US)

(72) Inventors: Anqi Joyce Yang, Toronto (CA); Can Cui, Toronto (CA); Ioan Andrei Bârsan, Toronto (CA); Shenlong Wang, Toronto (CA); Raquel Urtasun, Toronto (CA)

(73) Assignee: AURORA OPERATIONS, INC., Pittsburgh, PA (US)

(*) Notice: Subject to any disclaimer, the term of this patent is extended or adjusted under 35 U.S.C. 154(b) by 361 days.

(21) Appl. No.: 17/515,923

(22) Filed: Nov. 1, 2021

(65) Prior Publication Data
US 2022/0137636 A1    May 5, 2022

Related U.S. Application Data

(60) Provisional application No. 63/107,806, filed on Oct. 30, 2020.

(51) Int. Cl.
*G05D 1/00*       (2024.01)
*B60R 1/27*       (2022.01)
*G01S 17/894*     (2020.01)

(52) U.S. Cl.
CPC ............ *G05D 1/0251* (2013.01); *B60R 1/27* (2022.01); *G01S 17/894* (2020.01);
(Continued)

(58) Field of Classification Search
CPC .. G05D 1/0251; G05D 1/0212; G05D 1/0248; G01S 17/894; B60R 1/00; B60R 2300/303; B60R 2300/304
(Continued)

(56) References Cited

U.S. PATENT DOCUMENTS

2018/0051990 A1* 2/2018 Takeuchi ......... G08G 1/096827
2019/0080467 A1* 3/2019 Hirzer ..................... G06T 7/73
(Continued)

OTHER PUBLICATIONS

Agarwal et al, "Ford Multi-AV Seasonal Dataset," arXiv:2003.07969v1, Mar. 17, 2020, 7 pages.
(Continued)

*Primary Examiner* — Tiffany P Young
(74) *Attorney, Agent, or Firm* — Dority & Manning, P.A.

(57) ABSTRACT

Systems and methods for the simultaneous localization and mapping of autonomous vehicle systems are provided. A method includes receiving a plurality of input image frames from the plurality of asynchronous image devices triggered at different times to capture the plurality of input image frames. The method includes identifying reference image frame(s) corresponding to a respective input image frame by matching the field of view of the respective input image frame to the fields of view of the reference image frame(s). The method includes determining association(s) between the respective input image frame and three-dimensional map point(s) based on a comparison of the respective input image frame to the one or more reference image frames. The method includes generating an estimated pose for the autonomous vehicle the one or more three-dimensional map points. The method includes updating a continuous-time motion model of the autonomous vehicle based on the estimated pose.

20 Claims, 11 Drawing Sheets

(52) U.S. Cl.
CPC ......... *G05D 1/0212* (2013.01); *G05D 1/0248* (2013.01); *B60R 2300/303* (2013.01); *B60R 2300/304* (2013.01)

(58) Field of Classification Search
USPC .......................................................... 701/28
See application file for complete search history.

(56) References Cited

U.S. PATENT DOCUMENTS

| | | | | |
|---|---|---|---|---|
| 2020/0327343 | A1* | 10/2020 | Lund ....................... | H04W 4/46 |
| 2022/0121847 | A1* | 4/2022 | Sibley .................. | G05D 1/0253 |

OTHER PUBLICATIONS

Alcantarilla et al., "Fast Explicit Diffusion for Accelerated Features in Nonlinear Scale Spaces," British Machine Vision Conference, Sep. 9-13, 2013, Bristol, England, 11 pages.

Alismail et al., "Continuous Trajectory Estimation for 3D Slam from Actuated Lidar," International Confernce on Robotics and Automation, May 31-Jun. 5, 2014, Hong Kong, China, 6 pages.

Anderson et al, "A Hierarchical Wavelet Decomposition for Continuous-Time SLAM." International Conference on Robotics and Automation, May 31-Jun. 5, 2014, Hong Kong, China, 8 pages.

Anderson et al, "Batch Nonlinear Continuous-Time Trajectory Estimation as Exactly Sparse Gaussian Process Regression," arXiv:1412.0630v2, Dec. 1, 2014, 16 pages.

Bailey et al, "Simultaneous localization and mapping (SLAM): Part I," Robotics and Automation Magazine, vol. 13, No. 3, Jun. 5, 2006, 10 pages.

Boor, "On Calculating with B-splines," Journal of Approximation Theory, vol. 6, No. 1, 1972, pp. 50-62.

Burri et al., "The EuRoC Micro Aerial Vehicle Datasets," The International Journal of Robotics Research, Jan. 2016, 9 pages.

Cadena et al, "Past, Present, and Future of Simultaneous Localization and Mapping: Toward the Robust-Perception Age," Transactions on Robotics, vol. 32, No. 6, Dec. 2016, pp. 1309-1332.

Caesar et al, "nuScenes: A Multimodal Dataset for Autonomous Driving", arXiv:1903.11027v5, May 5, 2020, 16 pages.

Carlevaris-Bianco et al, "University of Michigan North Campus Long-Term Vision and Lidar Dataset," The International Journal of Robotics Research, vol. 35, No. 9, Aug. 2016, 29 pages.

Ceres solver, http://ceres-solver.org/, retrieved on May 19, 2022, 1 page.

D. Crouse, "Basic Tracking Using Nonlinear Continuous-Time Dynamic Models [Tutorial]," Aerospace and Electronic Systems Magazine, vol. 30, No. 2, 2015, pp. 4-41.

Davison et al, "Mobile Robot Localisation Using Active Vision", European Conference on Computer Vision, Jun. 2-6, 1998, Freiburg, Germany, 17 pages.

De Boor, "On calculating with B-splines," Journal of Approximation Theory, vol. 6, No. 1, Jul. 1972, pp. 50-62.

DeTone et al., "SuperPoint: Self-Supervised Interest Point Detection and Description," arXiv:1712.07629v4, Apr. 19, 2018, 13 pages.

Dong et al, "Sparse Gaussian Processes on Matrix Lie Groups: A Unified Framework for Optimizing Continuous-Time Trajectories," International Conference on Robotics and Automation, May 21-26, 2018, Brisbane, Australia, 8 pages.

Droeschel et al, "Efficient Continuous-Time SLAM for 3D Lidar-Based Online Mapping", arXiv:1810.06802v1, Oct. 16, 2018, 8 pages.

Dusmanu et al, "D2-Net: A Trainable CNN for Joint Description and Detection of Local Features," arXiv:1905.03561v1, May 9, 2019, 16 pages.

Engel et al, "Direct Sparse Odometry", arXiv:1607.02565v2, Oct. 7, 2016, 17 pages.

Engel et al, "Large-Scale Direct SLAM with Stereo Cameras," Conference on Intelligent Robot and Systems, Sep. 28-Oct. 3, 2015, Hamburg, Germany, 8 pages.

Engel et al, "LSD-SLAM: Large-Scale Direct Monocular SLAM," European Conference on Computer Vision, Sep. 6-12, 2014, Zurich, Switzerland, 16 pages.

Galvez-Lopez et al "Bags of Binary Words for Fast Place Recognition in Image Sequences," Transactions on Robot., vol. 28, No. 5, Oct. 2012, 9 pages.

Gao et al, "LDSO: Direct Sparse Odometry with Loop Closure," arXiv:1808.01111v1, Aug. 3, 2018, 7 pages.

Geiger et al, "Vision Meets Robotics: The KITTI Dataset," The International Journal of Robotics Research, vol. 32, No. 11, Sep. 2013, pp. 1231-1237.

Geyer et al, "A2D2: Audi Autonomous Driving Dataset," arXiv:2004.06320v1, Apr. 14, 2020, 10 pages.

Harmat et al, "Multi-Camera Tracking and Mapping for Unmanned Aerial Vehicles in Unstructured Environments." Journal of Intelligent & Robotic Systems, vol. 78, No. 2, Aug. 2014, 27 pages.

Hedborg et al, "Rolling Shutter Bundle Adjustment," Conference on Computer Vision and Pattern Recognition, Jun. 18-20, 2012, Rhode Island, United States, pp. 1434-1441.

Heng et al, "Self-Calibration and Visual SLAM with a Multi-Camera System on a Micro Aerial Vehicle," Robotics: Science and System Conference, Jul. 13-15, 2015, 10 pages.

Intel Real Sense, "Introduction to Intel RealSense Visual SLAM and the T265 Tracking Camera," https://www.intelrealsense.com/introduction-to-intel-realsense-visual-slam/, retrieved on May 19, 2022, 3 pages.

Irani et al, "All About Direct Methods", International Workshop on Vision Algorithms: Theory and Practice, Sep. 21-22, 1999, 12 pages.

Jin et al, "Image Matching Across Wide Baselines: From Paper to Practice," arXiv:2003.01587v5, Feb. 11, 2021, 27 pages.

Kerl et al, "Dense Continuous-Time Tracking and Mapping with Rolling Shutter RGB-D Cameras," International Conference on Computer Vision, Dec. 11-15, 2015, Santiago, Chile, 9 pages.

Kim et al, "A General Construction Scheme for Unit Quaternion Curves with Simple High Order Derivatives," Conference on Computer Graphics and Interactive Techniques, 1995, pp. 369-376.

Kim et al, "Direct Semi-Dense SLAM for Rolling Shutter Cameras," in Conference on Robotics and Automation, May 16-20, 2016, Stockholm, Sweden, 8 pages.

Klein et al, "Parallel Tracking and Mapping for Small AR Workspaces", International Symposium on Mixed and Augmented Reality, Nov. 13-16, 2007, Nara, Japan, 10 pages.

Leonard, "Directed sonar sensing for mobile robot navigation," University of Oxford, PhD Dissertation, 1990, 202 pages.

Li et al, "Survey of Maneuvering Target Tracking. Part I. Dynamic Models," Transactions on Aerospace and Electronic Systems, vol. 39, No. 4, Oct. 2003, pp. 1333-1364.

Lin et al, "Microsoft COCO: Common Objects in Context," arXiv:1405v0312v3, Feb. 21, 2015, 15 pages.

Liu et al, "Towards Robust Visual Odometry with a Multi-Camera System," International Conference on Intelligent Robots and Systems, Oct. 1-5, 2018, Madrid, Spain, 8 pages.

Lovegrove et al, "Spline Fusion: A Continuous-Time Representation for Visual-Inertial Fusion with Application to Rolling Shutter Cameras", British Machine Vision Conference, Sep. 9-13, 2013, Bristol, England, 8 pages.

Lowe, "Distinctive Image Features from Scale-Invariant Keypoints," International Journal of Computer Vision, vol. 60, No. 2, Nov. 2004, 28 pages.

Lucas et al, "An Iterative Image Registration Technique with an Application to Stereo Vision," Imaging Understanding Workshop, 1981, pp. 121-130.

Maddern et al, "1 Year, 1000km: The Oxford RobotCar Dataset," International Journal of Robotics Research, vol. 36, No. 1, Jan. 2017, 8 pages.

Meng et al., "Dense RGB-D Slam with Multiple Cameras," Sensors, vol. 18, No. 7, Jul. 2018, 12 pages.

(56) References Cited

OTHER PUBLICATIONS

Montemerlo et al., "FastSLAM: A Factored Solution to the Simultaneous Localization and Mapping Problem," Conference on Innovative Applications of Artificial Intelligence, Jul. 28-Aug. 1, 2002, Alberta, Canada, pp. 593-598.

Mur-Artal et al, "ORB-SLAM: A Versatile and Accurate Monocular SLAM System," Transactions on Robotics., vol. 31, No. 5, Oct. 2015, 17 pages.

Mur-Artal et al, "ORB-SLAM2: An Open-Source Slam System for Monocular, Stereo, and RGB-D Cameras", arXiv:1610.06475v2, Jun. 19, 2017, 9 pages.

Newcombe et al, "DTAM: Dense Tracking and Mapping in Real-Time," Conference on Computer Science, Jun. 10-12, 2011, Chengdu, Sichuan, China, 8 pages.

Ono et al, "LF-Net: Learning Local Features from Images," arXiv:1805.09662v2, Nov. 22, 2018, 13 pages.

Ovren et al, "Trajectory Representation and Landmark Projection for Continuous-Time Structure from Motion," arXiv:1805.02543v1, May 7, 2018, 14 pages.

Revaud et al, "R2D2: Reliable and Repeatable Detector and Descriptor," arXiv:1906.06195v2, Jun. 17, 2019, 12 pages.

Rublee et al, "ORB: An Efficient Alternative to SIFT or SURF," International Conference on Computer Vision, Nov. 6-13, 2-11, Barcelona, Spain, 8 pages.

Russakovsky et al, "ImageNet Large Scale Visual Recognition Challenge," arXiv:1409.0575v3, Jan. 30, 2015, 43 pages.

Schops et al., "BAD SLAM: Bundle Adjusted Direct RGB-D SLAM," Conference on Computer Vision and Pattern Recognition, Jun. 16-20, 2019, Long Beach, California, United States, pp. 134-144.

Schubert et al, "Direct Sparse Odometry with Rolling Shutter," European Conference on Computer Vision, Sep. 8-14, 2018, Munich, Germany, 16 pages.

Seok et al, "ROVINS: Robust Omnidirectional Visual Inertial Navigation System", International Conference on Intelligence Robots and Systems, Oct. 25-29, 2020, Las Vegas, Nevada, United States, 8 pages.

Shen et al., "RF-Net: An End-to-End Image Matching Network Based on Receptive Field," arXiv:1906.00604v1, Jun. 3, 2019, 9 pages.

Singh et al, "LOAM: Lidar Odometry and Mapping in Real-Time," in Robotics, Science and Systems, Jul. 12-16, 2014, Berkeley, California, United States, 9 pages.

Skydio X2, https://www.skydio.com/pages/skydio-x2, retrieved on May 19, 2022, 13 pages.

Sola et al, "Fusing Monocular Information in Multicamera SLAM," Transactions on Robotics, vol. 24, No. 5. Nov. 2008, 24 pages.

Sommer et al, "Efficient Derivative Computation for Cumulative B-Splines on Lie Groups," arXiv:1911.08860v2, May 30, 2020, 12 pages.

Sturm et al, "A Benchmark for the Evaluation of RGB-D Slam Systems." International Conference on Intelligent Robots and Systems Dec. 24, 2012, 8 pages.

Sun et al, "Scalability in Perception for Autonomous Driving: Waymo Open Dataset". arXiv:1912.04838v7, May 21, 2020, 9 pages.

Tang et al, "A White-Noise-On-Jerk Motion Prior for Continuous-Time Trajectory Estimation on SE(3)," arXiv:1809.06518v2, Jan. 21, 2019, 8 pages.

Thrun et al, "A Real-Time Algorithm for Mobile Robot Mapping with Applications to Multi-Robot and 3D Mapping", International Conference on Robotics and Automation, San Francisco, California, United States, Apr. 2000, 8 pages.

Tribou et al, "Multi-Camera Parallel Tracking and Mapping with Nonoverlapping Fields of View," International Journal of Robotics Research, vol. 34, No. 12, Jan. 12, 2015, 43 pages.

Triggs et al, "Bundle Adjustment—A Modern Synthesis", International Workshop on Vision Algorithms, Sep. 21-22, 1999, Corfu, Greece, 71 pages.

Urban et al., "MultiCol-SLAM—A Modular Real-Time Multicamera SLAM System", arXiv:1610.07336v1, Oct. 24, 2016, 15 pages.

Wang et al, "TartanAir: A dataset to push the limits of Visual SLAM", arXiv:2003.14338v2, Aug. 8, 2020, 8 pages.

Wenzel et al, "4Seasons: A Cross-Season Dataset for Multi-Weather SLAM in Autonomous Driving," arXiv:2009.06364v2, Oct. 14, 2020, 14 pages.

Wong et al, "A Data-Driven Motion Prior for Continuous-Time Trajectory Estimation on SE(3)," Robotics and Automation Letters, vol. 5, No. 2, Apr. 2020, pp. 1429-1426.

Xie et al, "Semantic Instance Annotation of Street Scenes By 3D To 2D Label Transfer", arXiv:1511.03240v2, Apr. 12, 2016, 10 pages.

Ye et al, "Robust and Efficient Vehicles Motion Estimation with Low-Cost Multi-Camera and Odometergyroscope," International Conference on Intelligent Robots and Systems, Nov. 4-8, 2019, Macau, China, pp. 4490-4496.

Zefran, "Continuous Methods for Motion Planning," Institute for Research in Cognitive Science, Technical Reports Series, Dec. 1996, 163 pages.

Zeng et al, "End-to-End Interpretable Neural Motion Planner," arXiv:2101.06679v1, Jan. 17, 2021, 10 pages.

Zhang et al, "VINS-MKF: A Tightly-Coupled Multi-Keyframe Visual-Inertial Odometry for Accurate and Robust State Estimation," Sensors, vol. 8, No. 11, Jul. 2018, 28 pages.

Zhou et al, "DA4AD: End-to-End Deep Attention Aware Features Aided Visual Localization for Autonomous Driving," arXiv:2003.03026v2, Jul. 13, 2020, 19 pages.

Zisserman, "Three Things Everyone Should Know to Improve Object Retrieval." Conference on Computer Vision and Pattern Recognition, Jun. 16-21, 2012, Providence, Rhode Island, United States, 8 pages.

\* cited by examiner

SYSTEMS AND METHODS FOR SIMULTANEOUS LOCALIZATION AND MAPPING USING ASYNCHRONOUS MULTI-VIEW CAMERAS

RELATED APPLICATION

The present application is based on and claims the benefit of U.S. Provisional Patent Application No. 63/107,806 having a filing date of Oct. 30, 2020, which is incorporated by reference herein.

BACKGROUND

An autonomous platform can process data to perceive an environment through which the platform can travel. For example, an autonomous vehicle can perceive its environment using a variety of sensors and identify objects around the autonomous vehicle. The autonomous vehicle can identify an appropriate path through the perceived surrounding environment and navigate along the path with minimal or no human input.

SUMMARY

Aspects and advantages of embodiments of the present disclosure will be set forth in part in the following description, or may be learned from the description, or may be learned through practice of the embodiments. The present disclosure describes the simultaneous localization and mapping of a robotic platform based on asynchronous image frames. A robotic platform (or one or more sensors thereof) can leverage machine-learning and other algorithms to perceive a previously unmapped environment and determine its location relative to the unmapped environment. The simultaneous localization and mapping technique described herein provides a generalized multi-image device formulation which accounts for asynchronous sensor observations. To do so, the technique utilizes (1) the generation of "asynchronous multi-frames" which group together a number of images captured from the asynchronous cameras at different times within a threshold period of time, and (2) a continuous-time motion model that relates spatio-temporal information to an autonomous vehicle from the asynchronous multi-frames for trajectory estimation. For example, the simultaneous localization and mapping process may include determining a new asynchronous multi-frame for each group of images captured within the threshold period of time. The system can generate a rough pose estimate by comparing features extracted from the newly determined multi-frame to reference images of a previously determined "key" multi-frame. The system can selectively promote the new asynchronous multi-frame is to a new "key" asynchronous multi-frame in the event of a significant change (e.g., a change in pose, distance, overlapping observed features, etc.) from the previously determined "key" multi-frame to the new asynchronous multi-frame. If the new asynchronous multi-frame is promoted, features of the new asynchronous multi-frame are used to simultaneously refine: (i) the positions for a plurality of three-dimensional points representative of the robotic platform's environment; and (ii) a continuous-time motion model representative of the robotic platform's trajectory relative to the plurality of three-dimensional points.

Aspects of the present disclosure can provide a number of technical improvements to navigation, robotics, and localization and mapping technology. The improved simultaneous localization and mapping techniques described herein can leverage knowledge from a plurality asynchronous multi-view image devices to reduce tracking failures due to occlusion, dynamic objects, lighting changes, textureless scenes, etc. The present disclosure describes a multi-view visual simultaneous localization and mapping technique that is generalized and agnostic to the image device timing and scalable and robust to real-world conditions. This, in turn, can enable the synchronization of image devices to other sensors of a robotic platform, thereby enabling increased accuracy for autonomy tasks without decreasing a robotic platform's ability to navigate in a previously unmapped environment. In this way, the systems and methods of the present disclosure provide an improved approach to simultaneous localization and mapping of a robotic platform that is specifically tailored to the sensors used by autonomous robotic platforms. This, in turn, can increase the performance of robotic platforms by providing an effective localization and mapping technique for autonomous navigation in previously unmapped environments.

The systems and methods described herein can accumulate and utilize newly available information and data structures such as asynchronous multi-frames, continuous time motion models, etc. to provide practical improvements to navigation, robotics, and localization and mapping technology. The improved localization and mapping techniques described herein replace previous visual localization and mapping techniques that rely on synchronized image devices. The localization and mapping techniques described herein do not require synchronized image devices, thereby generalizing the use of visual localization and mapping techniques to robotic platforms with asynchronous image devices. Specifically, the present disclosure describes receiving a plurality of input image frames from a plurality of asynchronous image devices of a robotic platform. The plurality of input image frames can be grouped into a new data structure, an asynchronous multi-frame, and used to generate an estimated pose for the robotic platform. For instance, one or more associations between the asynchronous multi-frame and a three-dimensional environment of the robotic platform can be determined, an estimated pose for the robotic platform can be generated relative to the environment based on the one or more associations, and a trajectory represented by a continuous-time motion model can be updated based on the estimated pose. In this manner, the systems and methods described herein can increase the applicability of simultaneous localization and mapping techniques to additional sensor configurations. This, in turn, improves the functioning of navigation, robotics, and localization and mapping technologies by increasing the localization and mapping accuracy of robotic platforms operating in unmapped environments. Ultimately, the techniques disclosed herein result in more accurate, robust, and efficient localization and mapping techniques, thereby improving the on road performance for a vast array of robotic technologies.

As an example, in an aspect, the present disclosure provides a computer-implemented method. The computer-implemented method includes receiving a plurality of input image frames from a plurality of asynchronous image devices of an autonomous vehicle. At least a subset of the plurality of input image frames have a plurality of different capture times. The method includes identifying one or more reference image frames that at least partially overlap a field of view of a respective input image frame of the plurality of input image frames. The one or more reference image frames are associated with one or more reference times preceding the plurality of different capture times. The method includes determining one or more associations between the respective input image frame and one or more three-dimensional map points of a plurality of three-dimensional map points representative of an environment of the autonomous vehicle based on a comparison of the respective input image frame to the one or more reference image frames. The method includes generating an estimated pose for the autonomous vehicle relative to the environment at a respective time of the plurality of different capture times based on the one or more associations between the respective input image frame and the one or more three-dimensional map points. The method includes updating a trajectory of the autonomous vehicle through the environment based on the estimated pose for the autonomous vehicle. The trajectory of the autonomous vehicle is represented as a continuous-time motion model.

In some implementations, (i) the plurality of three-dimensional map points and (ii) the continuous-time motion model are previously generated based on the one or more reference image frames.

In some implementations, determining the one or more associations between the respective input image frame and the one or more three-dimensional map points of the plurality of three-dimensional map points representative of the environment of the autonomous vehicle based on the comparison of the respective input image frame to the one or more reference image frames includes: (i) processing the respective input image frame with a point extractor model to generate one or more two-dimensional points of interest for the respective input image frame; (ii) identifying one or more matching two-dimensional points of interest for at least one of the one or more reference image frames that correspond to the one or more two-dimensional points of interest for the respective input image frame; and (iii) determining the one or more associations between the respective input image frame and the one or more three-dimensional map points based on the one or more matching two-dimensional points of interest for the at least one of the one or more reference image frames.

In some implementations, the plurality of input image frames correspond to an input multi-frame of a plurality of multi-frames received by the autonomous vehicle during an operational time period. The plurality of multi-frames include one or more key multi-frames. The (i) plurality of three-dimensional map points and (ii) continuous-time motion model are previously generated based on the one or more key multi-frames.

In some implementations, the one or more key multi-frames are associated with one or more key times preceding the plurality of different capture times. The one or more reference image frames correspond to a recent key multi-frame associated with a recent key time of the one or more key times that is closest in time to the plurality of different capture times.

In some implementations, updating the trajectory of the autonomous vehicle through the environment based on the estimated pose for the autonomous vehicle includes: (a) selecting the input multi-frame as a new key multi-frame based on: (i) the estimated pose for the autonomous vehicle relative to the environment at the respective input time or (ii) a quantity of the one or more three-dimensional map points; and (b) in response to selecting the input multi-frame as the new key multi-frame, updating the trajectory of the autonomous vehicle through the environment based on the input multi-frame.

In some implementations, updating the trajectory of the autonomous vehicle through the environment based on the estimated pose for the autonomous vehicle further includes: (c) in response to selecting the input multi-frame as the new key multi-frame, refining a position of at least one of the plurality of three-dimensional map points based on the input multi-frame.

In some implementations, the continuous-time motion model includes a cumulative cubic basis spline parameterized by a set of control poses and updating the trajectory of the autonomous vehicle through the environment based on the estimated pose for the autonomous vehicle includes updating the set of control poses based on the input multi-frame and one or more previous estimated poses corresponding to the one or more key multi-frames. In some implementations, updating the set of control poses based on the input multi-frame and the one or more previous estimated poses corresponding to the one or more key multi-frames includes refining at least one of the one or more previous poses corresponding to the one or more key multi-frames based on the input multi-frame.

In some implementations, updating the trajectory of the autonomous vehicle through the environment based on the estimated pose for the autonomous vehicle includes, in response to selecting the input multi-frame as the new key multi-frame, generating one or more new three-dimensional map points based on the input multi-frame and the updated set of control poses. The one or more new three-dimensional map points are generated based on a comparison between (i) at least two input images frames of the plurality of input image frames or (ii) at least one input image frame and at least one key image frame of at least one of the one or more key multi-frames.

In some implementations, generating the estimated pose for the autonomous vehicle relative to the environment at the respective time of the plurality of different capture times based on the one or more associations between the respective input image frame and the one or more three-dimensional map points include generating the estimated pose for the autonomous vehicle relative to the environment at the respective time of the plurality of different capture times based on a continuous-time linear motion model and a previously estimated pose corresponding to the one or more reference image frames.

In some implementations, the method further includes determining that the environment of the autonomous vehicle corresponds to a revisited environment. The revisited environment indicative of a respective environment that has been previously visited by the autonomous vehicle. In response to determining that the environment of the autonomous vehicle corresponds to the revisited environment, the method includes (i) adjusting the trajectory of the autonomous vehicle based on one or more previously estimated vehicle poses associated with the revisited environment, and (ii) updating the plurality of map points representative of the environment of the autonomous vehicle based on the adjusted trajectory of the autonomous vehicle.

In some implementations, determining that the environment of the autonomous vehicle corresponds to the revisited environment includes: (i) determining a travel distance for the autonomous vehicle; (ii) determining a similarity score for the plurality of input image frames and the one or more reference image frames; (iii) determining a geometry score for the plurality of input image frames based on a relative pose associated with the plurality of input image frames and the one or more previously estimated poses associated with the revisited environment; and (iv) determining that the environment of the autonomous vehicle corresponds to the revisited environment based on the travel distance, the similarity score, and the geometry score.

In some implementations, the plurality of asynchronous image devices of the autonomous vehicle are associated with a plurality of different fields of view.

As another example, in an aspect, the present disclosure provides an autonomous vehicle control system including one or more processors and one or more computer-readable mediums storing instructions that when executed by the one or more processors cause the autonomous vehicle control system to perform operations. The operations include receiving a plurality of input image frames from a plurality of asynchronous image devices of an autonomous vehicle. At least a subset of the plurality of input image frames have a plurality of different capture times. The operations include identifying one or more reference image frames that at least partially overlap a field of view of a respective input image frame of the plurality of input image frames. The one or more reference image frames are associated with one or more reference times preceding the plurality of different capture times. The operations include determining one or more associations between the respective input image frame and one or more three-dimensional map points of a plurality of three-dimensional map points representative of an environment of the autonomous vehicle based on a comparison of the respective input image frame to the one or more reference image frames. The operations include generating an estimated pose for the autonomous vehicle relative to the environment at a respective time of the plurality of different capture times based on the one or more associations between the respective input image frame and the one or more three-dimensional map points.

In some implementations, the operations include updating a trajectory of the autonomous vehicle through the environment based on the estimated pose for the autonomous vehicle relative to the environment at the respective time of the plurality of different capture times. The trajectory of the autonomous vehicle is represented as a continuous-time motion model.

In some implementations, (i) the plurality of three-dimensional map points and (ii) the continuous-time motion model are previously generated based on the one or more reference image frames.

As yet another example, in an aspect, the present disclosure provides an autonomous vehicle including a plurality of asynchronous image devices configured to capture a plurality of image frames at a plurality of asynchronous times from a plurality of different views, one or more processors, and one or more computer-readable mediums storing instructions that when executed by the one or more processors cause the autonomous vehicle to perform operations. The operations include receiving a plurality of input image frames from the plurality of asynchronous image devices. At least a subset of the plurality of input image frames have a plurality of different capture times. The operations include identifying one or more reference image frames that at least partially overlap a field of view of a respective input image frame of the plurality of input image frames. The one or more reference image frames are associated with one or more reference times preceding the plurality of different capture times. The operations include determining one or more associations between the respective input image frame and one or more three-dimensional map points of a plurality of three-dimensional map points representative of an environment of the autonomous vehicle based on a comparison of the respective input image frame to the one or more reference image frames. The operations include generating an estimated pose for the autonomous vehicle relative to the environment at a respective time of the plurality of different capture times based on the one or more associations between the respective input image frame and the one or more three-dimensional map points. The operations include updating a trajectory of the autonomous vehicle through the environment based on the estimated pose for the autonomous vehicle. The trajectory of the autonomous vehicle is represented as a continuous-time motion model.

In some implementations, the autonomous vehicle further includes a light detection and ranging system. The at least one of the plurality asynchronous image devices is synchronized with the light detection and ranging system.

Other example aspects of the present disclosure are directed to other systems, methods, vehicles, apparatuses, tangible non-transitory computer-readable media, and devices for performing simultaneous localization and mapping and other functions described herein. These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

With reference now to FIGS. 1-11, example embodiments of the present disclosure will be discussed in further detail.

Figure 1:
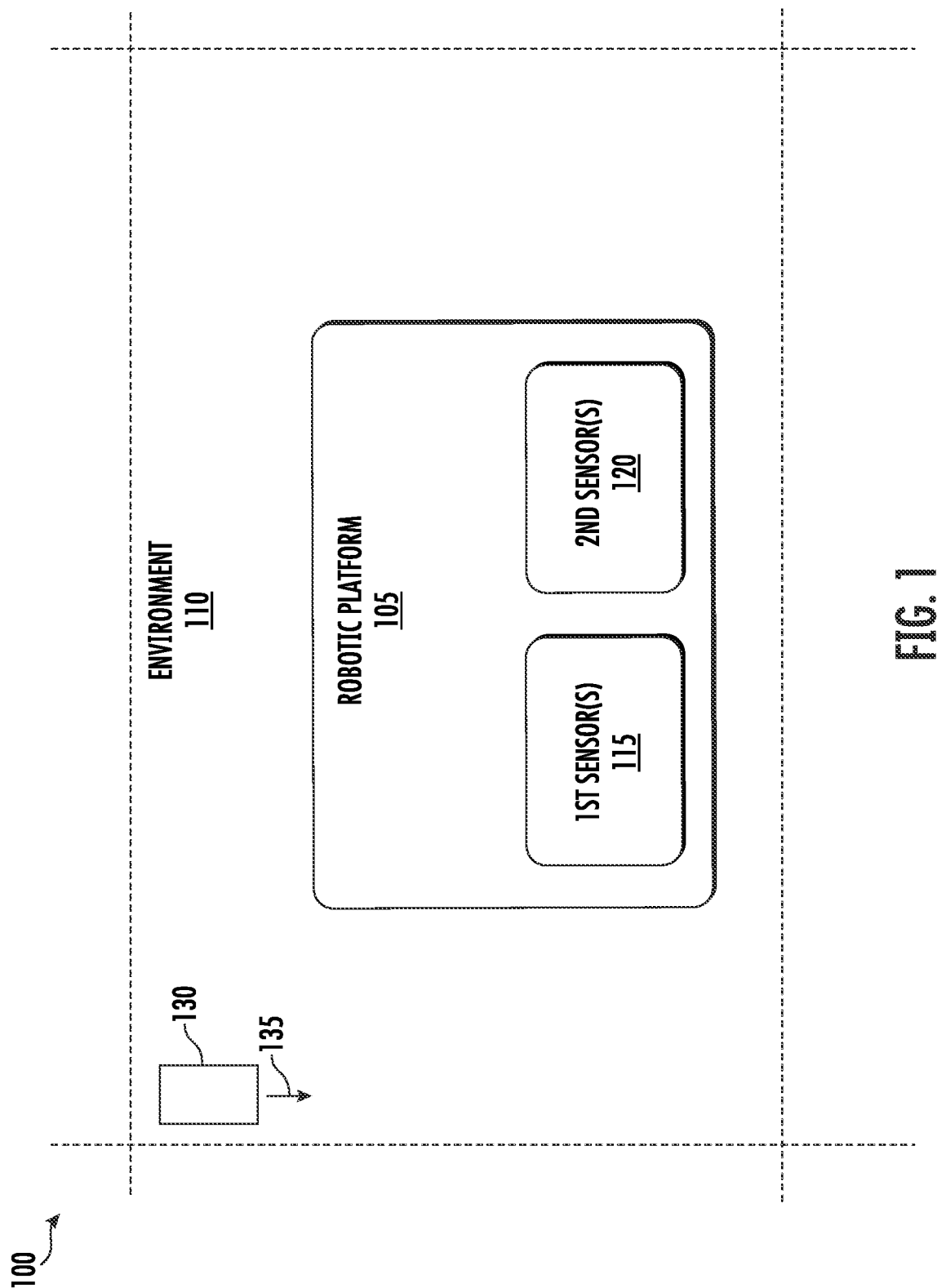
FIG. 1 is a block diagram of an operational scenario, according to some implementations of the present disclosure.

FIG. 1 is a block diagram of an operational scenario 100, according to some implementations of the present disclosure. The operational scenario 100 includes a robotic platform 105 and an environment 110. The environment 110 can be external to the robotic platform 105. The environment 110 can include a previously mapped environment or an unmapped environment. The robotic platform 105, for example, can operate within the environment 110. The environment 110 can include an indoor environment (e.g., within one or more facilities) or an outdoor environment. An outdoor environment, for example, can include one or more areas in the outside world such as, for example, one or more rural areas (e.g., with one or more rural travel ways, etc.), one or more urban areas (e.g., with one or more city travel ways, etc.), one or more suburban areas (e.g., with one or more suburban travel ways, etc.), etc. An indoor environment, for example, can include environments enclosed by a structure such as a building (e.g., a service depot, manufacturing facility, etc.). The environment 110 can include a real-world environment or a simulated environment. A simulated environment, for example, can include a generated environment modelled after one or more real-world scenes and/or scenarios. The operation of the robotic platform 105 can be simulated within a simulated environment by providing data indicative of the simulated environment (e.g., historical data associated with a corresponding real-world scene, data generated based on one or more heuristics, etc.) to one or more systems of the robotic platform 105.

The environment 110 can include one or more dynamic object(s) 130 (e.g., simulated objects, real-world objects, etc.). The dynamic object(s) 130 can include any number of moveable objects such as, for example, one or more pedestrians, animals, vehicles, etc. The dynamic object(s) 130 can move within the environment according to one or more trajectories 135. The robotic platform 105 can include one or more sensor(s) 115, 120. The one or more sensors 115, 120 can be configured to generate or store data descriptive of the environment 110 (e.g., one or more static or dynamic object(s) 130 therein). The sensor(s) 115, 120 can include one or more Light Detection and Ranging (LiDAR) systems, one or more Radio Detection and Ranging (RADAR) systems, one or more cameras (e.g., visible spectrum cameras or infrared cameras), one or more sonar systems, one or more motion sensors, or other types of image capture devices or sensors. The sensor(s) 115, 120 can include multiple sensors of different types. For instance, the sensor(s) 115, 120 can include one or more first sensor(s) 115 and one or more second sensor(s) 120. The first sensor(s) 115 can include a different type of sensor than the second sensor(s) 120. By way of example, the first sensor(s) 115 can include one or more imaging device(s) (e.g., cameras, etc.), whereas the second sensor(s) 120 can include one or more depth measuring device(s) (e.g., LiDAR device, etc.).

In some implementations, the sensor(s) 115, 120 can include a plurality of asynchronous image devices configured to capture a plurality of image frames at a plurality of asynchronous times from a plurality of different views. In addition, or alternatively, the sensor(s) 120 can include one or more light detection and ranging systems that are configured to rotate with respect to the robotic platform 105. As one example, the sensor(s) 115 can include the plurality of asynchronous image devices disposed at different locations on the robotic platform 105 and configured to capture image frames with different fields of view with respect to the robotic platform 105 and the sensor(s) 120 can include one or more light detection and ranging systems that are configured to rotate with respect to the robotic platform 105. The sensor(s) 115 (e.g., the plurality asynchronous image devices) can be synchronized with the movements of the sensor(s) 120 (e.g., a light detection and ranging system).

The robotic platform 105 can include any type of platform configured to operate within the environment 110. For example, the robotic platform 105 can include one or more different type(s) of vehicle(s) configured to perceive and operate within the environment 110. The vehicles, for example, can include one or more autonomous vehicle(s) such as, for example, one or more autonomous trucks. By way of example, the robotic platform 105 can include an autonomous truck including an autonomous tractor coupled to a cargo trailer. In addition, or alternatively, the robotic platform 105 can include any other type of vehicle such as one or more aerial vehicles, ground-based vehicles, water-based vehicles, space-based vehicles, etc.

Figure 2:
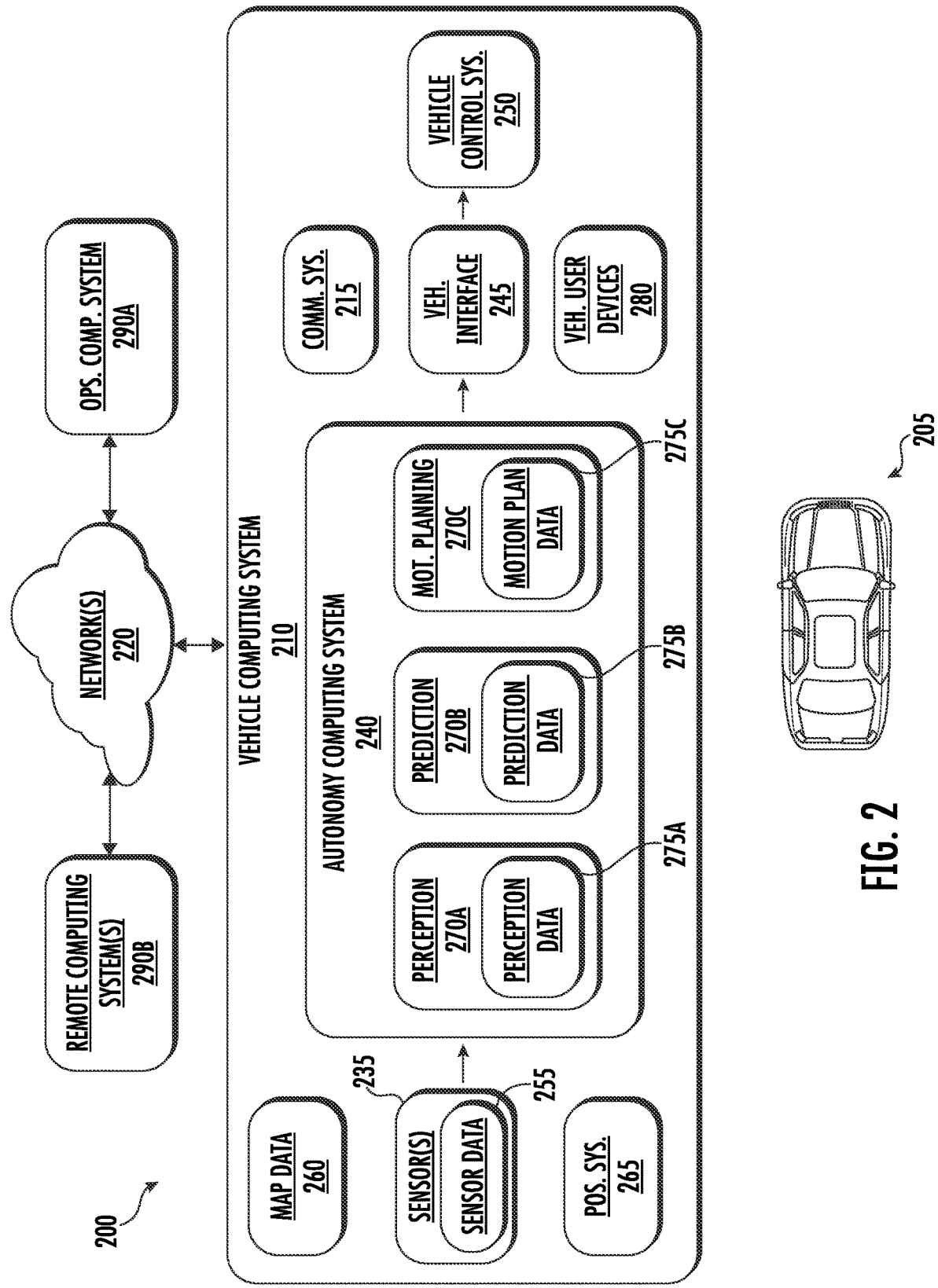
FIG. 2 is a block diagram of a system, according to some implementations of the present disclosure.

FIG. 2 is a block diagram of a system 200, according to some implementations of the present disclosure. More particularly, FIG. 2 illustrates a vehicle 205 including various systems and devices configured to control the operation of the vehicle 205. For example, the vehicle 205 can include an onboard vehicle computing system 210 (e.g., located on or within the autonomous vehicle, etc.) that is configured to operate the vehicle 205. Generally, the vehicle computing system 210 can obtain sensor data 255 from a sensor system 235 (e.g., sensor(s) 115, 120 of FIG. 1) onboard the vehicle 205, attempt to comprehend the vehicle's surrounding environment by performing various processing techniques on the sensor data 255, and generate an appropriate motion plan through the vehicle's surrounding environment (e.g., environment 110 of FIG. 1).

The vehicle 205 incorporating the vehicle computing system 210 can be various types of vehicles. For instance, the vehicle 205 can be an autonomous vehicle. The vehicle 205 can be a ground-based autonomous vehicle (e.g., car, truck, bus, etc.). The vehicle 205 can be an air-based autonomous vehicle (e.g., airplane, helicopter, etc.). The vehicle 205 can be a lightweight electric vehicle (e.g., bicycle, scooter, etc.). The vehicle 205 can be another type of vehicle (e.g., watercraft, etc.). The vehicle 205 can drive, navigate, operate, etc. with minimal or no interaction from a human operator (e.g., driver, pilot, etc.). In some implementations, a human operator can be omitted from the vehicle 205 or also omitted from remote control of the vehicle 205. In some implementations, a human operator can be included in the vehicle 205.

The vehicle 205 can be configured to operate in a plurality of operating modes. The vehicle 205 can be configured to operate in a fully autonomous (e.g., self-driving) operating mode in which the vehicle 205 is controllable without user input (e.g., can drive and navigate with no input from a human operator present in the vehicle 205 or remote from the vehicle 205). The vehicle 205 can operate in a semi-autonomous operating mode in which the vehicle 205 can operate with some input from a human operator present in the vehicle 205 (or a human operator that is remote from the vehicle 205). The vehicle 205 can enter into a manual operating mode in which the vehicle 205 is fully controllable by a human operator (e.g., human driver, pilot, etc.) and can be prohibited or disabled (e.g., temporary, permanently, etc.) from performing autonomous navigation (e.g., autonomous driving, flying, etc.). The vehicle 205 can be configured to operate in other modes such as, for example, park or sleep modes (e.g., for use between tasks/actions such as waiting to provide a vehicle service, recharging, etc.). In some implementations, the vehicle 205 can implement vehicle operating assistance technology (e.g., collision mitigation system, power assist steering, etc.), for example, to help assist the human operator of the vehicle 205 (e.g., while in a manual mode, etc.).

To help maintain and switch between operating modes, the vehicle computing system 210 can store data indicative of the operating modes of the vehicle 205 in a memory onboard the vehicle 205. For example, the operating modes can be defined by an operating mode data structure (e.g., rule, list, table, etc.) that indicates one or more operating parameters for the vehicle 205, while in the particular operating mode. For example, an operating mode data structure can indicate that the vehicle 205 is to autonomously plan its motion when in the fully autonomous operating mode. The vehicle computing system 210 can access the memory when implementing an operating mode.

The operating mode of the vehicle 205 can be adjusted in a variety of manners. For example, the operating mode of the vehicle 205 can be selected remotely, off-board the vehicle 205. For example, a remote computing system 290B (e.g., of a vehicle provider or service entity associated with the vehicle 205) can communicate data to the vehicle 205 instructing the vehicle 205 to enter into, exit from, maintain, etc. an operating mode. By way of example, such data can instruct the vehicle 205 to enter into the fully autonomous operating mode.

In some implementations, the operating mode of the vehicle 205 can be set onboard or near the vehicle 205. For example, the vehicle computing system 210 can automatically determine when and where the vehicle 205 is to enter, change, maintain, etc. a particular operating mode (e.g., without user input). Additionally, or alternatively, the operating mode of the vehicle 205 can be manually selected through one or more interfaces located onboard the vehicle 205 (e.g., key switch, button, etc.) or associated with a computing device within a certain distance to the vehicle 205 (e.g., a tablet operated by authorized personnel located near the vehicle 205 and connected by wire or within a wireless communication range). In some implementations, the operating mode of the vehicle 205 can be adjusted by manipulating a series of interfaces in a particular order to cause the vehicle 205 to enter into a particular operating mode.

The operations computing system 290A can include multiple components for performing various operations and functions. For example, the operations computing system 290A can be configured to monitor and communicate with the vehicle 205 or its users. In some implementations, this can include coordinating a vehicle service provided by the vehicle 205. To do so, the operations computing system 290A can communicate with the one or more remote computing system(s) 290B or the vehicle 205 through one or more communications network(s) including the network(s) 220. The network(s) 220 can send or receive signals (e.g., electronic signals) or data (e.g., data from a computing device) and include any combination of various wired (e.g., twisted pair cable) or wireless communication mechanisms (e.g., cellular, wireless, satellite, microwave, and radio frequency) or any desired network topology (or topologies). For example, the network 220 can include a local area network (e.g., intranet), wide area network (e.g., the Internet), wireless LAN network (e.g., through Wi-Fi), cellular network, a SATCOM network, VHF network, a HF network, a WiMAX based network, or any other suitable communications network (or combination thereof) for transmitting data to or from the vehicle 205.

Each of the one or more remote computing system(s) 290B or the operations computing system 290A can include one or more processors and one or more memory devices. The one or more memory devices can be used to store instructions that when executed by the one or more processors of the one or more remote computing system(s) 290B or operations computing system 290A cause the one or more processors to perform operations or functions including operations or functions associated with the vehicle 205 including sending or receiving data or signals to or from the vehicle 205, monitoring the state of the vehicle 205, or controlling the vehicle 205. The one or more remote computing system(s) 290B can communicate (e.g., exchange data or signals) with one or more devices including the operations computing system 290A and the vehicle 205 through the network 220.

The one or more remote computing system(s) 290B can include one or more computing devices such as, for example, one or more devices associated with a service entity, one or more operator devices associated with one or more vehicle providers (e.g., providing vehicles for use by the service entity), user devices associated with one or more vehicle passengers, developer devices associated with one or more vehicle developers (e.g., a laptop/tablet computer configured to access computer software of the vehicle computing system 210), etc. One or more of the devices can receive input instructions from a user or exchange signals or data with an item or other computing device or computing system (e.g., the operations computing system 290A). Further, the one or more remote computing system(s) 290B can be used to determine or modify one or more states of the vehicle 205 including a location (e.g., a latitude and longitude), a velocity, an acceleration, a trajectory, a heading, or a path of the vehicle 205 based in part on signals or data exchanged with the vehicle 205. In some implementations, the operations computing system 290A can include the one or more remote computing system(s) 290B.

The vehicle computing system 210 can include one or more computing devices located onboard the vehicle 205. For example, the computing device(s) can be located on or within the vehicle 205. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the vehicle 205 (e.g., its computing system, one or more processors, etc.) to perform operations and functions, such as those described herein for simultaneously mapping and predicting a location for the autonomous vehicle 205 within an unmapped environment.

The vehicle 205 can include a communications system 215 configured to allow the vehicle computing system 210 (and its computing device(s)) to communicate with other computing devices. The communications system 215 can include any suitable components for interfacing with one or more network(s) 220, including, for example, transmitters, receivers, ports, controllers, antennas, or other suitable components that can help facilitate communication. In some implementations, the communications system 215 can include a plurality of components (e.g., antennas, transmitters, or receivers) that allow it to implement and utilize multiple-input, multiple-output (MIMO) technology and communication techniques.

The vehicle computing system 210 can use the communications system 215 to communicate with one or more computing device(s) that are remote from the vehicle 205 over one or more networks 220 (e.g., through one or more wireless signal connections). The network(s) 220 can exchange (send or receive) signals (e.g., electronic signals), data (e.g., data from a computing device), or other information and include any combination of various wired (e.g., twisted pair cable) or wireless communication mechanisms (e.g., cellular, wireless, satellite, microwave, and radio frequency) or any desired network topology (or topologies). For example, the network(s) 220 can include a local area network (e.g., intranet), wide area network (e.g., Internet), wireless LAN network (e.g., through Wi-Fi), cellular network, a SATCOM network, VHF network, a HF network, a WiMAX based network, or any other suitable communication network (or combination thereof) for transmitting data to or from the vehicle 205 or among computing systems.

As shown in FIG. 2, the vehicle computing system 210 can include the one or more sensors 235, the autonomy computing system 240, the vehicle interface 245, the one or more vehicle control systems 250, and other systems, as described herein. One or more of these systems can be configured to communicate with one another through one or more communication channels. The communication channel(s) can include one or more data buses (e.g., controller area network (CAN)), on-board diagnostics connector (e.g., OBD-II), or a combination of wired or wireless communication links. The onboard systems can send or receive data, messages, signals, etc. amongst one another through the communication channel(s).

In some implementations, the sensor(s) 235 can include at least two different types of sensor(s). For instance, the sensor(s) 235 can include at least one first sensor (e.g., the first sensor(s) 115, etc.) and at least one second sensor (e.g., the second sensor(s) 120, etc.). The at least one first sensor can be a different type of sensor than the at least one second sensor. For example, the at least one first sensor can include one or more image capturing device(s) (e.g., one or more cameras, RGB cameras, etc.). In addition, or alternatively, the at least one second sensor can include one or more depth capturing device(s) (e.g., LiDAR sensor, etc.). The at least two different types of sensor(s) can obtain sensor data (e.g., a portion of sensor data 255) indicative of one or more dynamic objects within an environment of the vehicle 205. As described herein with reference to the remaining figures, the sensor data 255 can be collected in real-time while the vehicle 205 is operating in a real-world environment or the sensor data 255 can be fed to the sensor(s) 235 to simulate a simulated environment. The sensor data 255, for example, can include a plurality of image frames captured from different sensor(s) 235 (e.g., asynchronous image capture device, etc.) from a plurality of different fields of view at a plurality of different times, etc.

More generally, the sensor(s) 235 can be configured to acquire sensor data 255. The sensor(s) 235 can be external sensors configured to acquire external sensor data. This can include sensor data associated with the surrounding environment (e.g., in a real-world or simulated environment) of the vehicle 205. The surrounding environment of the vehicle 205 can include/be represented in the field of view of the sensor(s) 235. For instance, the sensor(s) 235 can acquire image or other data of the environment outside of the vehicle 205 and within a range or field of view of one or more of the sensor(s) 235. This can include different types of sensor data acquired by the sensor(s) 235 such as, for example, data from one or more Light Detection and Ranging (LIDAR) systems, one or more Radio Detection and Ranging (RADAR) systems, one or more cameras (e.g., visible spectrum cameras, infrared cameras, etc.), one or more motion sensors, one or more audio sensors (e.g., microphones, etc.), or other types of imaging capture devices or sensors. The one or more sensors can be located on various parts of the vehicle 205 including a front side, rear side, left side, right side, top, or bottom of the vehicle 205 (e.g., as described in further detail with respect to FIG. 4). The sensor data 255 can include image data (e.g., 2D camera data, video data, etc.), RADAR data, LIDAR data (e.g., 3D point cloud data, etc.), audio data, or other types of data. The vehicle 205 can also include other sensors configured to acquire data associated with the vehicle 205. For example, the vehicle 205 can include inertial measurement unit(s), wheel odometry devices, or other sensors.

The sensor data 255 can be indicative of one or more objects within the surrounding environment of the vehicle 205. The object(s) can include, for example, vehicles, pedestrians, bicycles, or other objects. The object(s) can be located in front of, to the rear of, to the side of, above, or below the vehicle 205, etc. The sensor data 255 can be indicative of locations associated with the object(s) within the surrounding environment of the vehicle 205 at one or more times. The object(s) can be static objects (e.g., not in motion) or dynamic objects/actors (e.g., in motion or likely to be in motion) in the vehicle's environment. The sensor data 255 can also be indicative of the static background of the environment. The sensor(s) 235 can provide the sensor data 255 to the autonomy computing system 240, the remote computing system(s) 290B, or the operations computing system 290A.

In addition to the sensor data 255, the autonomy computing system 240 can obtain map data 260. The map data 260 can provide detailed information about the surrounding environment of the vehicle 205 or the geographic area in which the vehicle was, is, or will be located. For example, the map data 260 can provide information regarding: the identity and location of different roadways, road segments, buildings, or other items or objects (e.g., lampposts, crosswalks or curbs); the location and direction of traffic lanes (e.g., the location and direction of a parking lane, a turning lane, a bicycle lane, or other lanes within a particular roadway or other travel way or one or more boundary markings associated therewith); traffic control data (e.g., the location and instructions of signage, traffic lights, or other traffic control devices); obstruction information (e.g., temporary or permanent blockages, etc.); event data (e.g., road closures/traffic rule alterations due to parades, concerts, sporting events, etc.); nominal vehicle path data (e.g., indication of an ideal vehicle path such as along the center of a certain lane, etc.); or any other map data that provides information that assists the vehicle computing system 210 in processing, analyzing, and perceiving its surrounding environment and its relationship thereto. In some implementations, the map data 260 can include high definition map data. In some implementations, the map data 260 can include sparse map data indicative of a limited number of environmental features (e.g., lane boundaries, etc.). In some implementations, the map data 260 can be limited to geographic area(s) or operating domains in which the vehicle 205 (or autonomous vehicles generally) may travel (e.g., due to legal/regulatory constraints, autonomy capabilities, or other factors). In some implementations, the autonomous vehicle 205 can travel in unmapped geographic area(s) and/or operating domains by, for example, using the simultaneous localization and mapping techniques described herein.

The vehicle 205 can include a positioning system 265. The positioning system 265 can determine a current position of the vehicle 205. This can help the vehicle 205 localize itself within its environment. The positioning system 265 can be any device or circuitry for analyzing the position of the vehicle 205. For example, the positioning system 265 can determine position by using one or more of inertial sensors (e.g., inertial measurement unit(s), etc.), a satellite positioning system, based on IP address, by using triangulation or proximity to network access points or other network components (e.g., cellular towers, WiFi access points, etc.) or other suitable techniques. The position of the vehicle 205 can be used by various systems of the vehicle computing system 210 or provided to a remote computing system. For example, the map data 260 can provide the vehicle 205 relative positions of the elements of a surrounding environment of the vehicle 205. The vehicle 205 can identify its position within the surrounding environment (e.g., across six axes, etc.) based at least in part on the map data 260. For example, the vehicle computing system 210 can process the sensor data 255 (e.g., LIDAR data, camera data, etc.) to match it to a map of the surrounding environment to get an understanding of the vehicle's position within that environment. As described in further detail herein, in some implementations, for example where map data 260 is unavailable for a particular geographic region, the vehicle computing system 210 can process the sensor data 255 (e.g., LIDAR data, camera data, etc.) to simultaneously map its environment and its location within the environment. Data indicative of the vehicle's position can be stored, communicated to, or otherwise obtained by the autonomy computing system 240.

The autonomy computing system 240 can perform various functions for autonomously operating the vehicle 205. For example, the autonomy computing system 240 can perform the following functions: perception 270A, prediction 270B, and motion planning 270C. For example, the autonomy computing system 240 can obtain the sensor data 255 through the sensor(s) 235, process the sensor data 255 (or other data) to perceive its surrounding environment, predict the motion of objects within the surrounding environment, and generate an appropriate motion plan through such surrounding environment. In some implementations, these autonomy functions can be performed by one or more sub-systems such as, for example, a perception system, a prediction system, a motion planning system, or other systems that cooperate to perceive the surrounding environment of the vehicle 205 and determine a motion plan for controlling the motion of the vehicle 205 accordingly. In some implementations, one or more of the perception, prediction, or motion planning functions 270A, 270B, 270C can be performed by (or combined into) the same system or through shared computing resources. In some implementations, one or more of these functions can be performed through different sub-systems. As further described herein, the autonomy computing system 240 can communicate with the one or more vehicle control systems 250 to operate the vehicle 205 according to the motion plan (e.g., through the vehicle interface 245, etc.).

The vehicle computing system 210 (e.g., the autonomy computing system 240) can identify one or more objects that are within the surrounding environment of the vehicle 205 based at least in part on the sensor data 255 or the map data 260. The objects perceived within the surrounding environment can be those within the field of view of the sensor(s) 235 or predicted to be occluded from the sensor(s) 235. This can include object(s) not in motion or not predicted to move (static objects) or object(s) in motion or predicted to be in motion (dynamic objects/actors). The vehicle computing system 210 (e.g., performing the perception function 270A, using a perception system, etc.) can process the sensor data 255, the map data 260, etc. to obtain perception data 275A. The vehicle computing system 210 can generate perception data 275A that is indicative of one or more states (e.g., current or past state(s)) of one or more objects that are within a surrounding environment of the vehicle 205. For example, the perception data 275A for each object can describe (e.g., for a given time, time period) an estimate of the object's: current or past location (also referred to as position); current or past speed/velocity; current or past acceleration; current or past heading; current or past orientation; size/footprint (e.g., as represented by a bounding shape, object highlighting, etc.); class (e.g., pedestrian class vs. vehicle class vs. bicycle class, etc.), the uncertainties associated therewith, or other state information. The vehicle computing system 210 can utilize one or more algorithms or machine-learned model(s) that are configured to identify object(s) based at least in part on the sensor data 255. This can include, for example, one or more neural networks trained to identify object(s) within the surrounding environment of the vehicle 205 and the state data associated therewith. The perception data 275A can be utilized for the prediction function 270B of the autonomy computing system 240.

The vehicle computing system 210 can be configured to predict a motion of the object(s) within the surrounding environment of the vehicle 205. For instance, the vehicle computing system 210 can generate prediction data 275B associated with such object(s). The prediction data 275B can be indicative of one or more predicted future locations of each respective object. For example, the portion of autonomy computing system 240 dedicated to prediction function 270B can determine a predicted motion trajectory along which a respective object is predicted to travel over time. A predicted motion trajectory can be indicative of a path that the object is predicted to traverse and an associated timing with which the object is predicted to travel along the path. The predicted path can include or be made up of a plurality of way points, footprints, etc. In some implementations, the prediction data 275B can be indicative of the speed or acceleration at which the respective object is predicted to travel along its associated predicted motion trajectory. The vehicle computing system 210 can utilize one or more algorithms or machine-learned model(s) that are configured to predict the future motion of object(s) based at least in part on the sensor data 255, the perception data 275A, map data 260, or other data. This can include, for example, one or more neural networks trained to predict the motion of the object(s) within the surrounding environment of the vehicle 205 based at least in part on the past or current state(s) of those objects as well as the environment in which the objects are located (e.g., the lane boundary in which it is travelling, etc.). The prediction data 275B can be utilized for the motion planning function 270C of the autonomy computing system 240.

The vehicle computing system 210 can determine a motion plan for the vehicle 205 based at least in part on the perception data 275A, the prediction data 275B, or other data. For example, the vehicle computing system 210 can generate motion planning data 275C indicative of a motion plan. The motion plan can include vehicle actions (e.g., speed(s), acceleration(s), other actions, etc.) with respect to one or more of the objects within the surrounding environment of the vehicle 205 as well as the objects' predicted movements. The motion plan can include one or more vehicle motion trajectories that indicate a path for the vehicle 205 to follow. A vehicle motion trajectory can be of a certain length or time range. A vehicle motion trajectory can be defined by one or more way points (with associated coordinates). The planned vehicle motion trajectories can indicate the path the vehicle 205 is to follow as it traverses a route from one location to another. Thus, the vehicle computing system 210 can take into account a route/route data when performing the motion planning function 270C.

The vehicle computing system 210 can implement an optimization algorithm, machine-learned model, etc. that considers cost data associated with a vehicle action as well as other objective functions (e.g., cost functions based on speed limits, traffic lights, etc.), if any, to determine optimized variables that make up the motion plan. The vehicle computing system 210 can determine that the vehicle 205 can perform a certain action (e.g., pass an object, etc.) without increasing the potential risk to the vehicle 205 or violating any traffic laws (e.g., speed limits, lane boundaries, signage, etc.). For instance, the vehicle computing system 210 can evaluate the predicted motion trajectories of one or more objects during its cost data analysis to help determine an optimized vehicle trajectory through the surrounding environment. The portion of autonomy computing system 240 dedicated to motion planning function 270C can generate cost data associated with such trajectories. In some implementations, one or more of the predicted motion trajectories or perceived objects may not ultimately change the motion of the vehicle 205 (e.g., due to an overriding factor). In some implementations, the motion plan may define the vehicle's motion such that the vehicle 205 avoids the object(s), reduces speed to give more leeway to one or more of the object(s), proceeds cautiously, performs a stopping action, passes an object, queues behind/in front of an object, etc.

The vehicle computing system 210 can be configured to continuously update the vehicle's motion plan and corresponding planned vehicle motion trajectories. For example, in some implementations, the vehicle computing system 210 can generate new motion planning data 275C/motion plan(s) for the vehicle 205 (e.g., multiple times per second, etc.). Each new motion plan can describe a motion of the vehicle 205 over the next planning period (e.g., next several seconds, etc.). Moreover, a new motion plan may include a new planned vehicle motion trajectory. Thus, in some implementations, the vehicle computing system 210 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the vehicle 205.

The vehicle computing system 210 can cause the vehicle 205 to initiate a motion control in accordance with at least a portion of the motion planning data 275C. A motion control can be an operation, action, etc. that is associated with controlling the motion of the vehicle 205. For instance, the motion planning data 275C can be provided to the vehicle control system(s) 250 of the vehicle 205. The vehicle control system(s) 250 can be associated with a vehicle interface 245 that is configured to implement a motion plan. The vehicle interface 245 can serve as an interface/conduit between the autonomy computing system 240 and the vehicle control systems 250 of the vehicle 205 and any electrical/mechanical controllers associated therewith. The vehicle interface 245 can, for example, translate a motion plan into instructions for the appropriate vehicle control component (e.g., acceleration control, brake control, steering control, etc.). By way of example, the vehicle interface 245 can translate a determined motion plan into instructions to adjust the steering of the vehicle 205 "X" degrees, apply a certain magnitude of braking force, increase/decrease speed, etc. The vehicle interface 245 can help facilitate the responsible vehicle control (e.g., braking control system, steering control system, acceleration control system, etc.) to execute the instructions and implement a motion plan (e.g., by sending control signal(s), making the translated plan available, etc.). This can allow the vehicle 205 to autonomously travel within the vehicle's surrounding environment.

The vehicle computing system 210 can store other types of data. For example, an indication, record, or other data indicative of the state of the vehicle (e.g., its location, motion trajectory, health information, etc.), the state of one or more users (e.g., passengers, operators, etc.) of the vehicle, or the state of an environment including one or more objects (e.g., the physical dimensions or appearance of the one or more objects, locations, predicted motion, etc.) can be stored locally in one or more memory devices of the vehicle 205. Additionally, the vehicle 205 can communicate data indicative of the state of the vehicle, the state of one or more passengers of the vehicle, or the state of an environment to a computing system that is remote from the vehicle 205, which can store such information in one or more memories remote from the vehicle 205. Moreover, the vehicle 205 can provide any of the data created or store onboard the vehicle 205 to another vehicle.

The vehicle computing system 210 can include the one or more vehicle user devices 280. For example, the vehicle computing system 210 can include one or more user devices with one or more display devices located onboard the vehicle 205. A display device (e.g., screen of a tablet, laptop, or smartphone) can be viewable by a user of the vehicle 205 that is located in the front of the vehicle 205 (e.g., driver's seat, front passenger seat). Additionally, or alternatively, a display device can be viewable by a user of the vehicle 205 that is located in the rear of the vehicle 205 (e.g., a back passenger seat). The user device(s) associated with the display devices can be any type of user device such as, for example, a table, mobile phone, laptop, etc. The vehicle user device(s) 280 can be configured to function as human-machine interfaces. For example, the vehicle user device(s) 280 can be configured to obtain user input, which can then be utilized by the vehicle computing system 210 or another computing system (e.g., a remote computing system, etc.). For example, a user (e.g., a passenger for transportation service, a vehicle operator, etc.) of the vehicle 205 can provide user input to adjust a destination location of the vehicle 205. The vehicle computing system 210 or another computing system can update the destination location of the vehicle 205 and the route associated therewith to reflect the change indicated by the user input.

As described in further detail herein, the autonomous vehicle 205 can be configured to operate (e.g., routed through, etc.) in previously mapped environments and/or unmapped environments. The vehicle computing system 210 can use various techniques for operating within an unmapped environment. As one example, the vehicle computing system 210 can implement one or more simultaneous localization and mapping techniques ("SLAM") for perceiving an unmapped environment and its location within the unmapped environment. The one or more SLAM techniques can include a task of localizing the autonomous vehicle 205 in an unmapped environment by building a map of the environment at the same time. SLAM tasks (e.g., visual SLAM) can be performed using various types of sensor data 255 such as image data captured from a number of different sensor(s) 235 (e.g., image devices). The vehicle computing system 210 can process the sensor data 255 to generate a three-dimensional map of its environment and determine its trajectory through the generated three-dimensional map. The resulting map data 260 and/or localization data can be utilized in one or more of the autonomy functions described herein such as, for example, perception 270A, prediction 270B, and/or motion planning 270C tasks.

Figure 3:
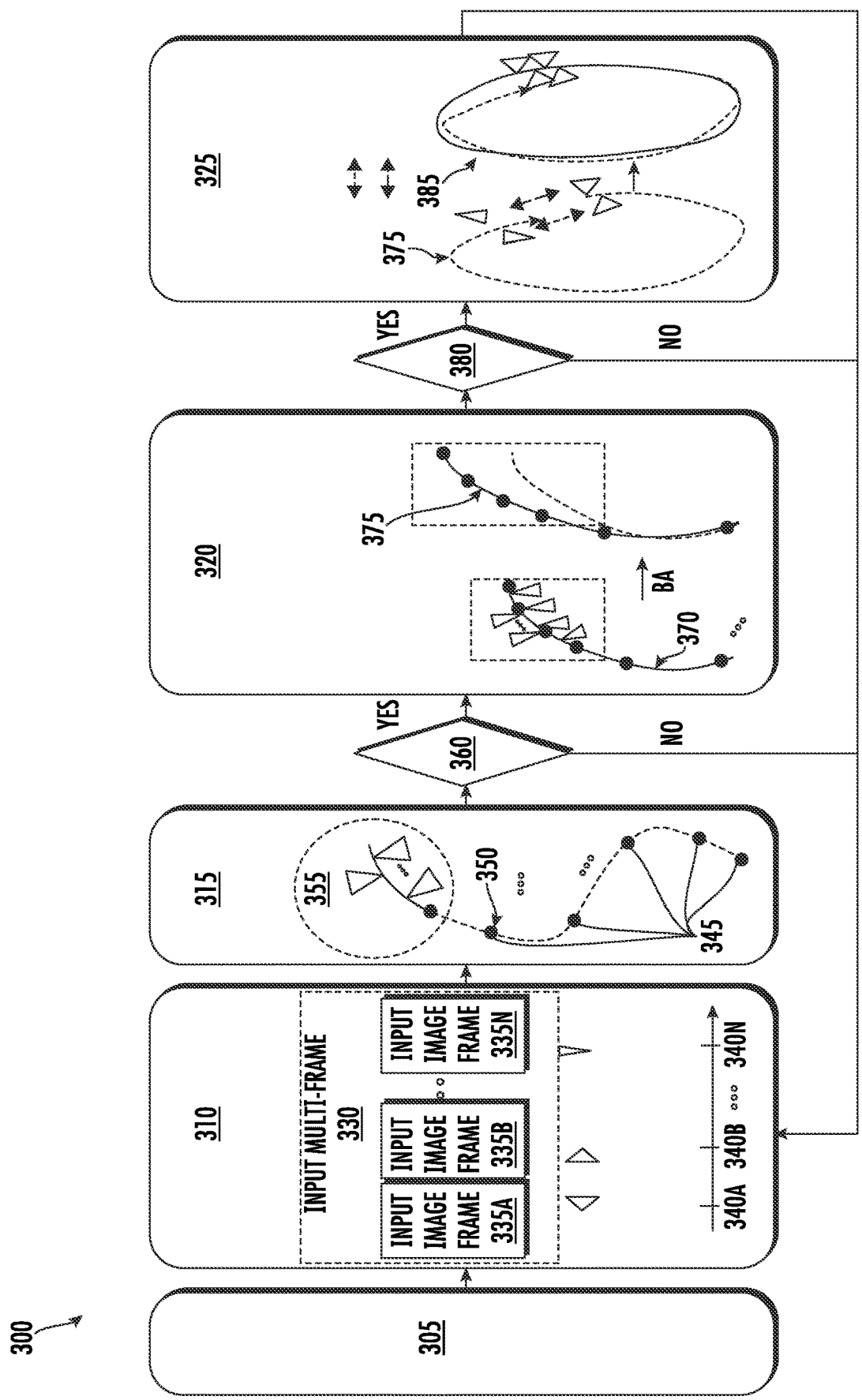
FIG. 3 is an example of a simultaneous localization and mapping technique, according to some implementations of the present disclosure.

FIG. 3 is an example of a simultaneous localization and mapping technique 300, according to some implementations of the present disclosure. The simultaneous localization and mapping technique 300 may include an initialization stage 305 during which an environment is initially mapped based on synchronized camera images, an input stage 310 during which an input multi-frame 330 is collected for the simultaneous localization and mapping of a robotic platform 105, a tracking stage 315 during which a rough pose estimate 355 of the robotic platform 105 is determined based on the input multi-frame 330, a local mapping stage 320 during which the input multi-frame 330 can be used to refine a three-dimensional environment of the robotic platform 105 and/or a continuous-time motion model representative of a trajectory of the robotic platform 105 relative to the three-dimensional environment, and a loop closing stage 325 during which a previously seen environment is recognized by the robotic platform. As described in further detail herein, the multi-stage simultaneous localization and mapping technique 300 can include the generation of asynchronous multi-frames 330, 345 and the integration of a continuous-time motion model 375 that relates spatio-temporal information from the asynchronous multi-frames 330, 345 to an autonomous vehicle for trajectory estimation.

The simultaneous localization and mapping technique 300 can be utilized to determine a trajectory represented by the continuous-time motion model 375 for a robotic platform 105 relative to a three-dimensional world environment. The coordinate frames (e.g., denoted as x with $F_x$) can include a world frame $F_w$, a moving robotic platform frame $F_b$, and an image device frame $F_k$ associated with each image device $C_k$ of the robotic platform 105. $T_{yx}$ can denote the rigid transformation that maps the homogeneous points from $F_x$ to $F_y$. A pose 355 of the robotic platform 105 can represented as a rigid transform from $F_b$ to $F_w$ as follows:

$$T_{wb} = \begin{bmatrix} R_{wb} & t_w \\ 0^T & 1 \end{bmatrix} \in \mathbb{SE}(3) \text{ with } R_{wb} \in \mathbb{SO}(3), t_w \in \mathbb{R}^3$$

where $R_{wb}$ is the 3×3 rotation matrix, $t_w$ is the translation vector, and $\mathbb{SE}(3)$ and $\mathbb{SO}(3)$ are the Special Euclidean and Special Orthogonal Matrix Lie Groups, respectively. The trajectory of the three-dimensional rigid body can be defined as a function $T_{wb}(t): \mathbb{R} \to \mathbb{SE}(3)$ over the time domain $t \in \mathbb{R}$. A six degree of freedom ("DoF") minimal pose representation associated with the Lie Algebra $\mathfrak{se}(3)$ (3) of the matrix group $\mathbb{SE}(3)$ can be widely adopted. It is a vector $\xi = [v\ w]^T \in \mathbb{R}^6$, where $v \in \mathbb{R}^3$ and $w \in \mathbb{R}^3$ encode the translation and rotation component respectively. The uppercase Exp (and, conversely, Log) can be used to define convert $\xi \in \mathbb{R}^6$ to $T \in \mathbb{SE}(3)$:$\text{Exp}(\xi) = \exp(\mathfrak{se}(3)) = T$, where exp is the matrix exponential, $$\xi^\wedge = \begin{bmatrix} w_\times & v \\ 0^T & 0 \end{bmatrix}$$

$\in \mathfrak{se}(3)$ (3) with $w_\times$ being 3×3 skew-symmetric matrix of w. The superscript c and l to denote a cubic basis-spline motion model $T^c(t)$ and the linear motion model $T^l(t)$, respectively.

The simultaneous localization and mapping technique 300 can be utilized in response to one or more conditions. The conditions can include, for example, receiving user input instructing the use of the simultaneous localization and mapping technique 300, detecting an unmapped environment and/or the robotic platform's approach to (and/or distance from) an unmapped environment, etc. An unmapped environment, for example, may include an environment in which the robotic platform 105 has less than a threshold amount of information. By way of example, an unmapped environment can include an environment that is not associated with previously generated map data or that is associated with map data that is unreliable and/or unverified, etc.

Figure 4A:
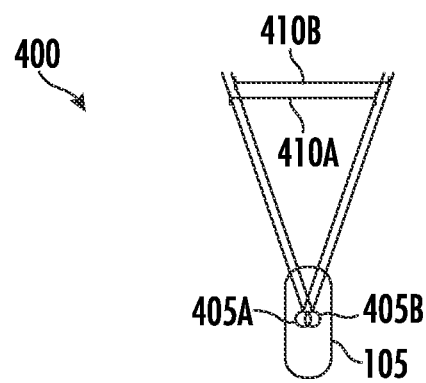
FIGS. 4A-B are example image device configurations for a robotic platform, according to some implementations of the present disclosure.

The simultaneous localization and mapping technique 300 may be begin with (e.g., in response to the one or more conditions, etc.) the initialization stage 305. The initialization stage 305 can include receiving a plurality of initial image frames. The initial image frames may include a plurality of two-dimensional images (e.g., red, green, blue images, etc.) captured from one or more different image devices of the robotic platform 105. By way of example, FIG. 4A is an example of an image device configuration 400, according to some implementations of the present disclosure. The image device configuration 400 can include at least two image devices 405A-B disposed on the robotic platform 105. The at least two image devices 405A-B can have respective fields of view 410A-B and/or capture times. In some implementations, the at least two image devices 405A-B can share overlapping fields of view 410A-B. For example, the field of view 410A of the first image device 405A can at least partially overlap with the field of view 410B of the second image device 405B. In some implementations, the at least two image device 405A-B can be configured to capture image frame(s) at one or more similar (e.g., synchronized) capture times. By way of example, the at least two image devices 405A-B can include a synchronous stereo camera pair that share an overlapping field of view and fire closely in time. In this manner, the initial image frames can include image frames that share an overlapping field of view and one or more matching capture times.

Turning back to FIG. 3, the simultaneous localization and mapping technique 300 can be initialized by grouping the initial image frames into an initial multi-frame. The initial multi-frame may comprise the initial image frames and the initial capture times associated with each initial image frame. In some implementations, the initial capture times can include a synchronized capture time from synchronized image devices (and/or unsynchronized image devices) such as, for example, the image devices 405A-B of FIG. 4A. The initial multi-frame can be selected as a first key multi-frame and a representative time (e.g., defined as $\bar{t}_0$), for the first key multi-frame can be set to a respective initial capture time (e.g., an average, median, etc. of the initial capture times) associated with initial image frames. In addition, a first control pose, (e.g., defined as $\xi_0^c$) for the continuous-time motion model 375 can be set to the origin of a world frame and the three-dimensional environment can be initialized with three-dimensional map points triangulated from the initial image frames (e.g., and parameters associated with the associated image devices 405A-B).

The simultaneous localization and mapping technique 300 can be utilized to track the location of the robotic platform 105 within the three-dimensional environment based on additional image frames collected at various times throughout an operational time period. For instance, during the tracking stage 315 of the simultaneous localization and mapping technique 300, a continuous pose 355 of a plurality of input image frames 335A-N can be determined for the robotic platform 105. For example, during the input stage 310, a plurality of input image frames 335A-N can be received by the robotic platform 105. The plurality of input image frames 335A-N (e.g., at least a subset thereof) can have different capture times 340A-N. Each capture time 340A-N can be represented by a timestamp identifying a time at which a respective image frame is captured by a respective image device.

Figure 4B:
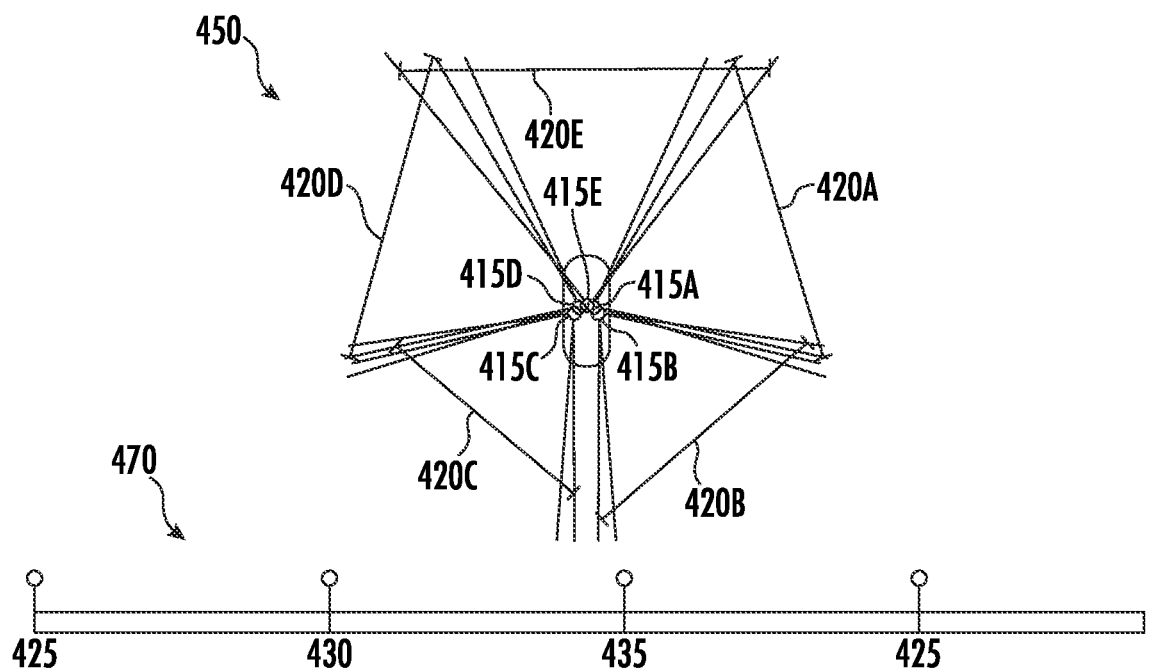

The plurality of input image frames 335A-N can be received from a plurality of asynchronous image devices during an operational time period. The plurality of asynchronous image devices can be associated with a plurality of different fields of view and/or be configured to capture images at a plurality of different, unsynchronized times. By way of example, FIG. 4B is an example image device configuration 450 for a robotic platform, according to some implementations of the present disclosure. The image device configuration 400 can include a plurality of image devices 415A-E disposed on the robotic platform 105. The plurality of image devices 415A-E can have respective fields of view 420A-E. In some implementations, the plurality of image devices 415A-E can share partially overlapping fields of view 420A-E covering a combined 360° field of view around the robotic platform 105.

The plurality of image devices 415A-E can have different capture times 425-435. For example, the plurality of image devices 415A-E can include a plurality of asynchronous image devices having different capture times 425-435 with respect to one another. The plurality of image devices 415A-E, for example, can be triggered at arbitrary capture times with respect to each other. The capture times 425-435 can be associated with a firing schedule 470. The firing schedule 470 can include one or more capture time(s) 425 for a subset of first image device(s) 415E, 415A; one or more capture time(s) 430 for a subset of second image device(s) 415B; one or more capture time(s) 435 for a subset of third image device(s) 415C-D, etc. The capture time(s) 425-435 can be relative to one another. For instance, each capture time (e.g., capture time 430) can be a time period (e.g., thirty-three milliseconds, etc.) after a preceding capture time (e.g., capture time 425).

In some implementations, the different capture times 425-435 for the plurality of asynchronous image devices 415A-E can be synchronized with one or more other sensors and/or devices of the robotic platform 105. By way of example, the robotic platform 105 can include a light detection and ranging ("LiDAR") system. In some implementations, the plurality asynchronous image devices 415A-E can be synchronized with the LiDAR system. For instance, the capture time(s) 425-435 can be configured to trigger the image device(s) 415A-E to capture image frames based on the orientation of the LiDAR system (e.g., a 10 Hz spinning LiDAR) such that image frames for a particular region are captured concurrently with three-dimensional LiDAR data for the particular region.

Each image device 415A-E (e.g., denoted as $C_k$) can be assumed to be a calibrated pinhole camera with intrinsics defined as a 3×3 matrix $K_k$, and extrinsics encoded by the mapping $T_{kb}$ from the body frame $F_b$ to camera frame $F_k$. The plurality of input image frames 335A-N of FIG. 3 can include a sequence of image and capture timestamp pairs $\{(I_{ik}, t_{tk})\}$ associated with each image device 415A-E (e.g., $C_k$).

Turning back to FIG. 3, the plurality of input image frames 335A-N can be grouped as an input multi-frame 330 based on the capture times 340A-N. For instance, the input multi-frame 330 can include a plurality of input image frames 335A-N captured within a threshold time period (e.g., within 100 ms, the time it takes for a LIDAR sweep). The threshold time period can be a predetermined time period and/or can be synchronized with another sensor of the robotic platform 105 (e.g., the threshold time period can be synced with a single LiDAR sweep, etc.). As opposed to synchronized multi-frames, the input multi-frame 330 can include (1) a set of image frame 335A-N and capture time 340A-N pairs (e.g., denoted $\{(I_{ik}, t_{tk})\}$ indexed by associated image device $C_k$, and (2) continuous-time motion model parameters to recover an estimated trajectory.

During the tracking stage 315, the continuous pose 355 of the input multi-frame 330 (e.g., denoted as $MF_t$) can be generated by matching the input multi-frame 330 with a reference multi-frame 350. For instance, one or more reference image frames can be identified that correspond to a respective input image frame of the plurality of input image frames 335A-N. The one or more reference image frames can be identified based on fields of view of the one or more reference image frames and the respective input image frame. By way of example, the one or more fields of view of the one or more reference image frames can at least partially overlap a field of view of the respective input image frame. In some implementations, one or more reference image frames can be identified for each respective input image of the plurality of input image frames 335A-N.

The one or more reference image frames can be associated with one or more reference times preceding the plurality of different capture times 340A-N.

A subset of the plurality of multi-frames can be selected as key multi-frames 345. The key multi-frames 345 can include a subset of the plurality of multi-frames that are selected for the simultaneous localization and mapping of the robotic platform 105. The plurality of key multi-frames 345 preceding the input multi-frame 330, for example, can be previously used to map a three-dimensional environment of the robotic platform 105 and/or generate a continuous time motion model 375 for the robotic platform 105 relative to the three-dimensional environment. By way of example, a plurality of three-dimensional map points and the continuous-time motion model 375 can be previously generated based on the one or more key multi-frames 345.

The one or more reference image frames can be identified from a reference key multi-frame 350. The reference key multi-frame 350, for example, can include a most recent key multi-frame of the plurality of key multi-frames 345 preceding the input multi-frame 330. By way of example, the key multi-frames 345 can be associated with one or more key times preceding the plurality of different capture times 340A-N. The one or more reference image frames can correspond to a recent key multi-frame 350 associated with a recent key time of the one or more key times that is closest in time to the plurality of different capture times 340A-N. In some implementations, one or more reference image frames can be identified from the reference key multi-frame 350 for each image frame of the plurality of input image frames 335A-N. For instance, for each respective image frame of the input multi-frame 330, reference images in the reference key multi-frame 350 can be identified as image frames captured by the same image device (e.g., at a previous capture time) used to capture the respective image frame and/or by an image device sharing an overlapping field of view with the image device used to capture the respective image frame.

A correlation between the robotic platform 105 and a three-dimensional environment mapped by the robotic platform 105 can be determined by associating the respective input image frame with one or more three-dimensional map points of the three-dimensional environment. For example, one or more associations between the respective input image frame and one or more three-dimensional map points of a plurality of three-dimensional map points representative of the environment of the autonomous vehicle can be determined based on a comparison of the respective input image frame to the one or more reference image frames. For instance, the respective input image frame can be processed with a point extractor model to generate one or more two-dimensional points of interest for the respective input image frame. One or more matching two-dimensional points of interest can be identified for at least one of the one or more reference image frames that correspond to the one or more two-dimensional points of interest for the respective input image frame. The one or more associations between the respective input image frame and the one or more three-dimensional map points can be determined based on the one or more matching two-dimensional points of interest for the at least one of the one or more reference image frames.

By way of example, sparse two-dimensional key points and associated descriptors can be extracted from the respective input image frame and matched against two-dimensional key points of the one or more respective reference image frames, to establish associations with existing three-dimensional map points (e.g., determined based on the preceding key multi-frames 345). The set of matches can be denoted as $\{(u_{i,k,j}, X_j)\}_{\forall (k,j)}$, where $u_{i,k,j} \in \mathbb{R}^2$ is the two-dimensional image key point extracted from image device $C_k$ in the input multi-frame 330 (e.g., denoted $MF_i$), and $X_j \in \mathbb{R}^3$ is the matched map point's position in the world frame.

An estimated pose 355 for the robotic platform 105 relative to the environment at a respective time of the plurality of different capture times 340A-N can be generated based on the one or more associations between the respective input image frame and/or the one or more three-dimensional map points. The estimated pose 355, for example, can be generated based on a continuous-time linear motion model and a previously estimated pose corresponding to the one or more reference image frames. For example, a continuous-time linear motion model (e.g., denoted $T_{wb}^l(t)$) can be used during tracking 315 to determine the estimated pose 355. Generally, given timestamps $t_1 \leq t_2$, and respective associated poses $T_1$, $T_2$, poses at any timestep t can be linearly interpolated or extrapolated as:

$$T^l(t) = T_2(T_2^{-1}T_1)^\alpha = T_2 \operatorname{Exp}(\alpha \operatorname{Log}(T_2^{-1}T_1))$$

where with $$\alpha = \frac{\bar{t}_2 - t}{\bar{t}_2 - \bar{t}_1}.$$

In the context of multi-frames, for each input multi-frame 330 (e.g., denoted $MF_i$) with the representative timestamp $\bar{t}_i$, the linear pose parameter $\xi_i^l \in \mathbb{R}^6$ can represent the minimal 6 degrees of freedom ("DoF") pose in the world frame at $\bar{t}_i$. An estimated pose 355 at any timestamp t within $MF_i$ can be evaluated with:

$$T_{wb}^l(t) = T_{wb}^l(\bar{t}_i)\operatorname{Exp}\left(\frac{\bar{t}_i - t}{\bar{t}_i - \bar{t}_{ref}}\operatorname{Log}\left(T_{wb}^l(\bar{t}_i)^{-1}T_{wb}^c(\bar{t}_{ref})\right)\right) =$$

$$\operatorname{Exp}(\xi_i^l)\operatorname{Exp}\left(\frac{\bar{t}_i - t}{\bar{t}_i - \bar{t}_{ref}}\operatorname{Log}\left(\operatorname{Exp}(-\xi_i^l)T_{wb}^c(\bar{t}_{ref})\right)\right)$$

where $\bar{t}_{ref}$ and $T_{wb}^c(\bar{t}_{ref})$ can be the respective representative timestamp and evaluated cubic basis-spline pose at $\bar{t}_{ref}$ of the reference multi-frame 350 (e.g., denoted $MF_{ref}$).

As discussed in further detail herein, the parameters of the continuous-time linear motion model can be used to initialize a cubic basis-spline model 375 during the local mapping stage 320. The estimated pose 355 (e.g., denoted $\xi_i^l \in \mathbb{R}^6$) at the respective timestamp (e.g., denoted $\bar{t}_i$) can be determined and the continuous pose 355 can be evaluated with linear interpolation:

$$T_{wb}^l = \operatorname{Exp}(\xi_i^l)(\operatorname{Exp}(\xi_i^l)^{-1}T_{wb}^c(\bar{t}_{ref}))^\alpha$$

with $$\alpha = \frac{\bar{t}_i - t}{\bar{t}_i - \bar{t}_{ref}}.$$

Coupled with the obtained multi-view associations, the pose estimation 355 for $\xi_i^l$ can be formulated as a constrained, asynchronous, multi-view case of the perspective-n-points (PnP) problem, in which a geometric energy is minimized:

$$E_{geo}(\xi_i^l) = \sum_{(k,j)} \rho\left(\|e_{i,k,j}(\xi_i^l)\|_{\Sigma_{i,j,k}^{-1}}^2\right)$$

where $e_{i,k,j} \in \mathbb{R}^2$ is the reprojection error of the matched correspondence pair $(u_{i,k,j}, X_j)$, and $\Sigma_{i,j,k} \in \mathbb{R}^{2 \times 2}$ is a diagonal covariance matrix denoting the uncertainty of the match. $\rho$ denotes a robust norm, with Huber loss used in practice.

A reprojection error for the pair can be defined in terms of the continuous-time trajectory as:

$$e_{i,k,j}(\xi_i^l) = u_{i,k,j} - \hat{u}_{i,k,j} = u_{i,k,j} - \pi_k(X_j, T_{wb}^i(t_{ik})T_{kb}^{-1})$$

where $\pi_k(\cdot,\cdot): \mathbb{R} \times \mathbb{SE}(3) \to \mathbb{R}^2$ is the perspective projection function of the image device $C_k$, $T_{kb}$ is the respective camera extrinsics matrix, and $T_{wb}^l$ is the linear model used during tracking 315 and to initialize the cubic basis-spline during the local mapping stage 320.

The estimated pose 355 can be initialized by linearly extrapolating poses from the previous two multi-frames $MF_{i-2}$ and $MF_{i-1}$ based on a constant-velocity assumption. The optimization can be wrapped in a random sample consensus loop (e.g., RANSAC loop), where only a minimal number of $(u_{i,k,j}, X_j)$ are sampled to obtain each hypothesis. The optimization can be solved with the Levenberg-Marquardt algorithm. The trajectory 370 of the robotic platform 105 through the environment can be updated based on the estimated pose 355 for the robotic platform 105. As described herein, the trajectory 370 of the robotic platform 105 can be represented as a continuous-time motion model 375.

At 360, it can be decided whether the input multi-frame 330 should be selected as a key multi-frame for map refinement and future tracking. In the event the input multi-frame 330 is not selected, another plurality of image frames are received, and the input stage 310 is repeated. In the event the input multi-frame 330 is selected, the input multi-frame 330 is used during the local mapping stage 320 and the loop closing stage 325 of the simultaneous localization and mapping technique 300. For example, in the event the input multi-frame 330 is selected, the trajectory 370 of the robotic platform 105 through the environment can be updated based on the estimated pose 355 for the robotic platform 105.

The input multi-frame 330 can be selected as a new key multi-frame based on: (i) the estimated pose for the robotic platform 105 relative to the environment at the respective input time or (ii) a quantity of the one or more three-dimensional map points. For instance, the estimated pose 355 of the robotic platform 105 can be compared to the estimated pose of the reference key image frame 350 to determine whether the estimated pose 355 has a translational and/or rotational change above a threshold. In addition, or alternatively, it can be determined whether the one or more three-dimensional map points associated with each of the respective input image frames 335A-N of the input multi-frame 330 is below a reobservation threshold. In either case, the input multi-frame 330 can be selected as the new key multi-frame.

By way of example, a hybrid key frame selection scheme can be determined based on the estimated motion and map point reobservability. The input multi-frame 330 can be registered as a key multi-frame if the tracked pose 355 has a local translational or rotational change above a certain threshold, or if the ratio of map points reobserved in a number of image devices (e.g., image device(s) 415A-E of FIG. 4) is below a certain threshold. In addition, to better condition the shape of a cubic basis-spline (e.g., representative of the robotic platform's trajectory, etc.) during the local mapping stage 320, a new key multi-frame can be regularly inserted during long periods of little change in motion and scenery (e.g., when the robotic platform 105 stops).

In response to selecting the input multi-frame 330 as the new key multi-frame, the trajectory 370 of the robotic platform 105 through the environment can be updated based on the input multi-frame 330. For instance, the estimated pose 355 and previously estimated poses and map points can be refined based on the latest observations of the input multi-frame 330. To do so, a set of control poses and map points can be jointly estimated. The estimated local trajectory 370 can be refined with a basis-spline model 375 parameterized by a set of control poses. A new control pose of the set of control poses can be determined based on the input multi-frame 330 with the estimated pose 355 determined during tracking 315. Future control poses can be linearly extrapolated based on existing control poses/timestamps. New map points can be triangulated with the estimated continuous-time poses and key point matches.

Figure 5:
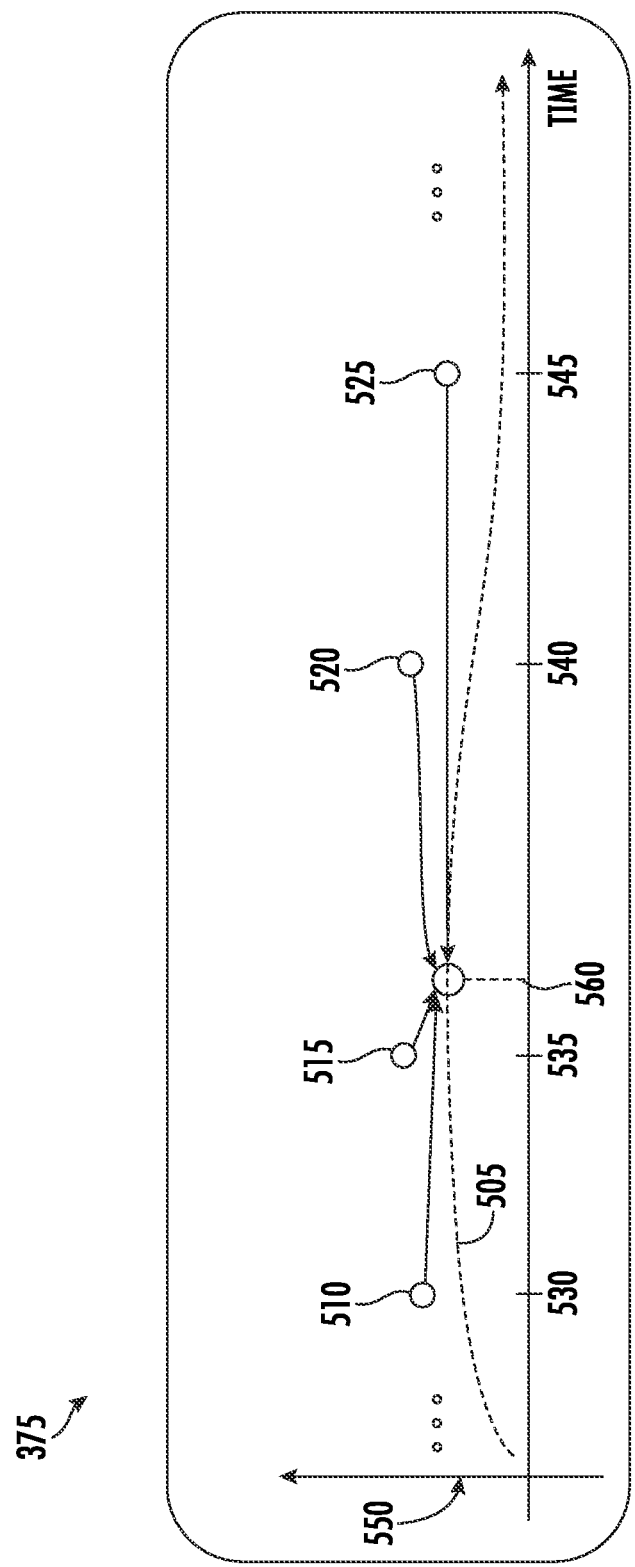
FIG. 5 is an example of a continuous-time motion model, according to some implementations of the present disclosure.

By way of example, FIG. 5 is an example of a continuous-time motion model 375, according to some implementations of the present disclosure. The continuous-time motion model 375 can be represented as one or more basis-spline(s) 505 parameterized by a plurality (e.g., four) control poses 510-525. Each control pose 510-525 can represent a spatio-temporal continuous pose of the robotic platform 105 over respective timesteps 530-545 and space 550. Each control pose 510-525 can correspond to a key multi-frame indexed at timesteps 530-545, respectively.

For instance, given a knot vector $b=[t_0, t_1, \ldots, t_7] \in \mathbb{R}^3$, a cumulative cubic basis-spline trajectory 375 (e.g., denoted $T_{wb}^c(t)$ over $t \in [t_3, t_4)$) can be defined by the four control poses 510-525 (e.g., denoted as $\xi_0^c, \ldots, \xi_3^c \in \mathbb{R}^6$). Each key multi-frame $KMF_i$ (e.g., multi-frames 345 of FIG. 3) can be associated with a control pose $\xi_i^c \in \mathbb{R}^6$. In some implementations, a non-uniform know vector can be used. For each key multi-frame 345 (e.g., $KMF_i$), a representative time 560 (e.g., denoted as $\bar{t}_i$) can be defined as the median of all capture times $t_{ik}$ and the knot vector can be defined as $b_i = [\bar{t}_{i-3}, \bar{t}_{i-2}, \bar{t}_{i+4}] \in \mathbb{R}^8$. The spline trajectory 505 over the time interval 530-545 (e.g., denoted as $t \in [\bar{t}_i, \bar{t}_{i+1}))$ can be expressed as a function of the four control poses 510-525 (e.g., $\xi_{i-1}^c, \xi_i^c, \xi_{i+1}^c, \xi_{i-2}^c$):

$$T_{wb}^c(t) = \text{Exp}(\xi_{i-1}^c) \prod_{j=1}^{3} \text{Exp}(\tilde{B}_{j,4}(t)\Omega_{i-1+j})$$

where $\Omega_{i-1+j} = \text{Log}(\text{Exp}(\xi_{i-2+j}^c)^{-1} \text{Exp}(\xi_{i-1+j}^c)) \in \mathbb{R}$ is the relative pose between control poses 510-525, and $\tilde{B}_{j,4}(t) = \Sigma_{l=j}^{3} B_{l,4}(t) \in \mathbb{R}$ is the cumulative basis function, where the basis function $B_{l,4}(t)$ is computed with the knot vector $b_i$ using the De Boor-Cox recursive formula.

Figure 6A:
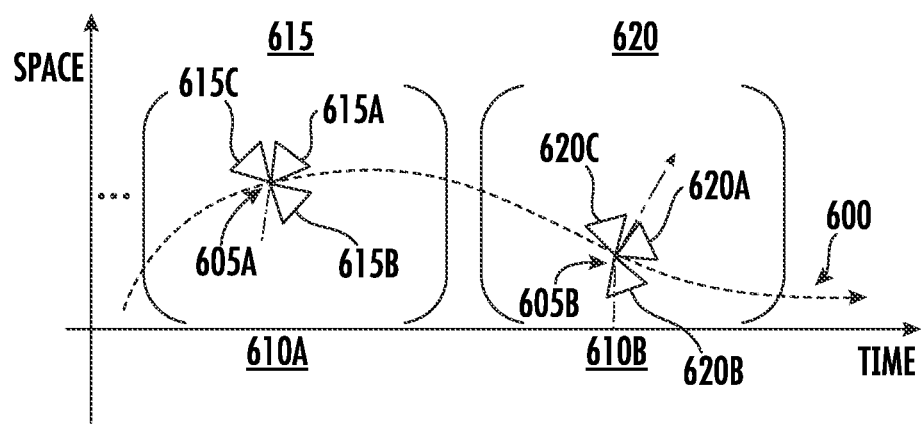
FIGS. 6A-B are examples of various implementations of a spatio-temporal trajectory, according to some implementations of the present disclosure.
Figure 6B:
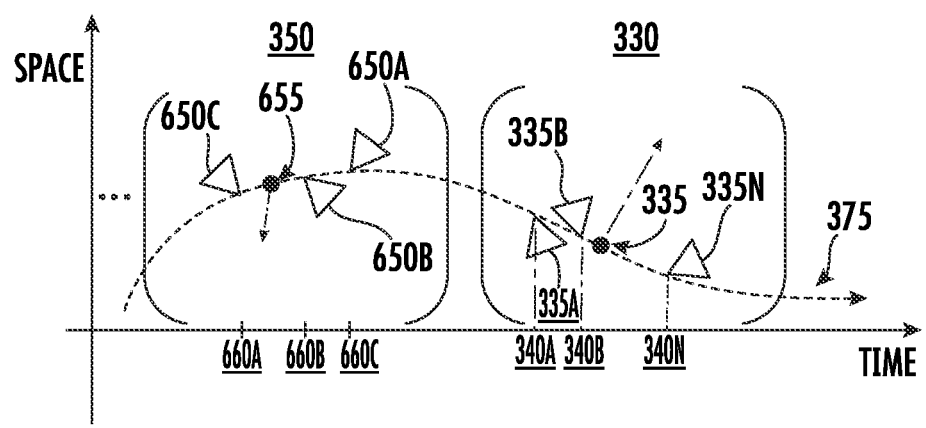

In this manner, the overall robot platform trajectory 375 can be formulated as a continuous-time function $T_{wb}(t): \mathbb{R} \to \mathbb{SE}(3)$, rather than as a sequence of discrete poses. The overall trajectory 375 can be modelled with a cumulative cubic basis-spline over asynchronous key multi-frames (e.g., multi-frames 345 of FIG. 3). FIGS. 6A-B are examples of various implementations of a spatio-temporal trajectory 600, 375, according to some implementations of the present disclosure. FIG. 6A is an example of a discrete trajectory 600 including a sequence of discrete poses and FIG. 6B is an example of the continuous-time motion model 375. The discrete trajectory 600 is represented by a plurality of discrete poses 605A and 605B. Each of the discrete poses 605A-B are associated with a respective time 610A, 610B. The discrete poses 605A-B are determined based on synchronized image frame(s) 615A-C of a synchronized multi-frame 615 and image frame(s) 620A-C of another synchronized multi-frame 620. The synchronized image frame(s) 615A-C of the synchronized multi-frame 615 each have the same respective capture time 610A and the synchronized image frame(s) 620A-C of the synchronized multi-frame 620 each have the same respective capture time 610B.

The continuous-time motion model 375 is generated based on asynchronized image frames 650A-C of the reference key multi-frame 350 having different capture times 660A-C and the input image frames 335A-N of the input multi-frame 330 having different capture times 340A-N. A first estimated pose 655 can be generated for the continuous-time motion model 375 based on the asynchronized image frames 650A-C of the reference key multi-frame 350 and a second estimated pose 355 can be generated for the continuous-time motion model 375 based on the asynchronized image frames 335A-N of the input multi-frame 330 in the manner described herein. The estimated poses 655 and 355 can be used as the control poses for the continuous-time motion model 375.

For example, given n+1 control poses $\xi_0^c, \ldots \xi_n^c \in \mathbb{R}^6$, and a knot vector $b \in \mathbb{R}^{n+k+1}$, the cumulative basis spine 375 of order k can be defined as:

$$T_{wb}^c(t) = \text{Exp}(\tilde{B}_{0,k}(t)\xi_n^c)\Pi_{i=1}^{n}\text{Exp}(\tilde{B}_{i,k}(t)\Omega_i,$$

where $\Omega_i = \text{Log}(\text{Exp}(\xi_{i-1}^c)^{-1}\text{Exp}(\xi_i^c)) \in \mathbb{R}^6$ is the relative pose in Lie Algebra form between control poses 655, 355 (e.g., $\xi_{i-1}^c$ and $\xi_i^c$). The cumulative basis functions $\tilde{B}_{i,k}(t) = \Sigma_{j=i}^{n} B_{j,k}(t) \in \mathbb{R}$ can be the sum of basis function $\tilde{B}_{j,k}(t)$ and based on the knot vector $b = [b_0, \ldots, b_{n+k}]$, the basis function $b_{j,k}(t)$ can be computed using the De Boor-Cox recursive formula, with the base case:

$$B_{p,1}(t) = \begin{cases} 1 \text{ if } t \in [b_p, b_{p+1}) \\ 0 \text{ otherwise} \end{cases}.$$

For $q \geq 2$, $$B_{p,q}(t) = \frac{t - b_p}{b_{p+q-1} - b_p} B_{p,q-1}(t) + \frac{b_{p+q} - t}{b_{p+q} - b_{p+1}} B_{p+1,q-1}(t).$$

Turning back to FIG. 3, at the local mapping stage 320, the trajectory 370 of the robotic platform 105 through the environment can be updated (e.g., by refining the continuous-time motion model 375) based on the input multi-frame 330. The continuous-time motion model 375, for example, can be refined based on the trajectory 370 (e.g., the estimated pose 355, etc.). As described herein, the continuous-time motion model 375 can include the cumulative cubic basis spline 375 parameterized by a set of control poses (e.g., control poses 510-525 of the FIG. 5). The set of control poses can be updated based on the input multi-frame 330 and/or one or more previous estimated poses corresponding to the one or more key multi-frames 345. For example, at least one of the one or more previous poses corresponding to the one or more key multi-frames 345 can be refined based on the input multi-frame 330. In addition, or alternatively, in response to selecting the input multi-frame 330 as the new key multi-frame, a position of at least one of the plurality of three-dimensional map points can be refined based on the input multi-frame 330.

By way of example, when a new key multi-frame is selected, a local bundle adjustment can be run to refine the three-dimensional map structure (e.g., the plurality of three-dimensional data points) and minimize drift accumulated from tracking errors in recent image frames. A windowed bundle adjustment can be used to refine poses and map points in a set of recent key multi-frames 345 based on the latest observations (e.g., from the input multi-frame 330). A mathematical formulation can be similar to the pose estimation problem, extended to a window of N frames $\{\xi_i^c\}_{1 \leq i \leq N}$ to jointly estimate a set of control poses and map points:

$$E_{geo}(\{\xi_i^c\}, \{X_j\}) = \sum_{(i,k,j)} \rho(\|e_{i,k,j}(\{\xi_i^c\}, X_j)\|_{\Sigma_{i,k,j}^{-1}}^2).$$

The estimated local trajectory 370 is refined with the cubic basis-spline model 375 (e.g., denoted $T_{wb}{}^c(t)$) parameterized by control poses $\{\xi_i^c\}$. The control pose $\xi_N^c$ of the newly-inserted key multi-frame 330 is initialized with the estimated pose 355 (e.g., denoted as $\xi_N^I$) estimated in tracking 315. For observations made after $\bar{t}_{N-1}$, the corresponding pose evaluation can involve control poses $\xi_{N+1}^c$ and $\xi_{N+2}^c$ and knot vector values $\bar{t}_{N+1 \leq p \leq N+4}$ which do not yet exist. The future control poses, and time stamps can be linearly extrapolated based on existing control poses and timestamps to be jointly optimized. The function can be minimized with the Levenberg-Marquardt algorithm.

In addition, or alternatively, during the local mapping stage 320, three-dimensional map points can be created and culled to reflect the latest changes to the continuous-time motion model 375. For instance, in response to selecting the input multi-frame 330 as the new key multi-frame, one or more new three-dimensional map points can be generated based on the input multi-frame 330 and the updated set of control poses. The one or more new three-dimensional map points can be generated based on a comparison between (i) at least two input images frames of the plurality of input image frames 335A-N and/or (ii) at least one input image frame and at least one key image frame of at least one of the one or more key multi-frames 345. By way of example, with a newly-inserted key multi-frame, new map points can be triangulated with the estimated continuous-time poses and key point matches, both between images frame within the same key multi-frame that share overlapping fields of view, as well as across images in the new key multi-frame 330 and previous key multi-frames 345. To increase robustness against dynamic objects and outliers, map points that are behind the image device and/or have reprojection errors above a certain threshold can be culled.

At the 380, it can be determined whether a previously mapped area has been reached by the robotic platform 105. For example, it can be determined that the environment of the autonomous vehicle corresponds to a revisited environment. The revisited environment can be indicative of a respective environment that has been previously visited by the robotic platform 105. The revisited environment can be determined, for example, based on an overlap between the three-dimensional map points and a previously mapped area. In addition, or alternatively, the revisited environment can be determined based on a multi-view similarity check and a multi-view geometric verification. With a wider field of view, the techniques described herein can offer the possibility of detecting loops 385 that are encountered at arbitrary angles.

As one example, it can be determined that the environment of the robotic platform corresponds to the revisited environment based on a travel distance, a similarity score, and a geometry score associated with the robotic platform 105 and the continuous-time motion model 375. For instance, when a new key multi-frame 330 is selected, a loop detection can be run to check if the current area is being revisited. For a query key multi-frame $KMF_q$ (e.g., input multi-frame 330), the loop candidate $KMF_i$ must pass at least one of an odometry check, a multi-camera DBoW3-based similarity check, and a multi-camera geometric verification.

For instance, a travel distance can be determined for the robotic platform 105. The odometry check can ensure that the robotic platform 105 has travelled a minimal distance since the loop candidate frame. In addition, a minimal time and/or a minimal number of key frames can have passed since the candidate frame as well. The traveling distance can be computed based on the estimated trajectory 375. The traveling distance condition can be necessary when the robotic platform 105 stays stationary for a long time. The time and number of key frame conditions can serve as complements in the case when the estimated traveling distance is unreliable. The traveling distance threshold can be set to any distance such as, for example, 5 meters, 10 meters, 20 meters, 30 meters, 100 meters, etc. The time threshold can be set to any period of time such as, for example, one or more seconds (e.g., five seconds, etc.), minutes, etc. The number of key multi-frames can be set to any number such as, for example, 5, 10, 15, 30, 100, etc.

In addition, or alternatively, a similarity score can be determined for the plurality of input image frames 335A-N and the one or more reference image frames. For candidates passing the odometry check, a multi-view version of a DBoW3-based similarity check can be performed. For each key multi-frame 345, features extracted from all images in the multi-frame can be concatenated to build the DBoW3 vocabulary and compute the DBoW3 vector. During the similarity check, the DBoW3 similarity score can be computed between the query key multi-frame 330 and the neighboring key multi-frames that are included in the associated local bundle adjustment window. The minimum similarity score can be denoted as m. A similarity score can be computed between the query key multi-frame and all available candidate key multi-frames. The top score can be denoted as t. All the candidates that pass the similarity check can have a similarity score that is greater than max(0.01, m, 0.9*t).

As yet another example, a geometry score can be determined for the plurality of input image frames 335A-N based on a relative pose associated with the plurality of input image frames 335A-N and the one or more previously estimated poses associated with the revisited environment. For each remaining candidate key multi-frame, a geometric check can be performed by directly solving a relative pose between image devices of the candidate key multi-frame and image devices of the query key multi-frame. For each possible matching scenario involving M pairs of image devices, a discrete relative pose between each image device pair can be solved for. Specifically, for each pair of image devices, key point-based sparse image matching between the associated image pair can be performed by fitting an essential matrix in a RANSAC loop. If the number of inlier matches passes a certain threshold, the inlier matches can be associated with the existing three-dimensional map points. If the number of such key-point-to-map-point correspondences passes a threshold, a relative pose can be estimated between the two cameras using the method Horn in a RANSAC loop.

The geometric check can pass if at least a certain number of camera pairs have a minimum number of inliers for the relative pose estimation. In a full system, a geometric check with the M=5 wide image devices covering the surroundings of the robotic platform 105 can be successful if the discrete relative pose can be estimated for at least two pairs of image devices, with at least twenty pairs inlier correspondences during sparse image matching, twenty pairs of two-dimensional-three-dimensional associations, and twenty pairs of inlier correspondences after the relative pose estimation.

A loop candidate passing all the checks can be denoted as $KMF_l$. The geometric verification step outputs $$\left\{ \left( C_{kl}, C_{kq}, T_{b_{k_q'} \cdot b_{k_q}} \right) \right\},$$

which is a set of triplets denoting matched image device pairs between the loop and the query frames, along with an estimated relative transform between the underlying robot poses at the associated image device capture times $t_{lk_l}$ and $t_{qk_q}$.

In response to determining that the environment of the robotic platform corresponds to the revisited environment, the simultaneous localization and mapping technique 300 can proceed to the loop closing stage 325. During the loop closing stage, the trajectory 375 of the robotic platform 105 can be adjusted based on one or more previously estimated vehicle poses 385 associated with the revisited environment. In addition, or alternatively, the plurality of map points representative of the environment of the autonomous vehicle can be updated based on the adjusted trajectory 385 of the robotic platform 105. In this manner, an accumulated drift can be adjusted for to achieve global consistency in mapping and trajectory estimation for the robotic platform 105.

To perform loop closure at stage 325, the cubic basis-spline motion model 375 can be integrated to formulate an asynchronous, multi-view case of the pose graph optimization problem. With a newly-detected loop candidate 385 (e.g., $KMF_l$) matching to multiple image devices in the current query $KMF_q$, a pose graph can be built. Each node $\alpha$ can be encoded by a timestamp $t_\alpha$ representing the underlying robotic platform pose $T_{wb}(t_\alpha)$. Each edge ($\alpha$, $\beta$) can encode the relative pose constraint $T_{\beta\alpha}$ representing the relative pose from $T_{wb}(t_\alpha)$ to $T_{wb}(t_\beta)$.

Specifically, in the pose graph, the nodes can be associated to times at $\{\bar{t}_i\}_{\forall KMF_i} \cup \{t_{lkl}, t_{qkq}\}_{\forall (k_l, k_q)}$. The edges can be comprised of: (1) neighboring edges connecting adjacent key multi-frame nodes at times $\bar{t}_{i-i}$ and $\bar{t}_i$, (2) past loop closure edges connecting nodes associated with past query and loop closure key multi-frames, and (3) the new loop closure edges between nodes at time $t_{lkl}$ and $t_{qkq}$. For edges in case (1) and (2), relative pose $t_{\beta\alpha}$ can be computed by evaluating $(T_{wb}{}^c(\bar{t}_\beta))^{-1} T_{wb}{}^c(\bar{t}_\alpha)$ based on the estimated control poses. For (3), the discrete poses $$T_{b_{k_q'} \cdot b_{k_q}}$$

verification step in loop detection can be used.

The local key multi-frame windows spanning the query 375 and loop 385 frames can be denoted as the welding windows. They can be the same size as the local bundle adjustment window. A pose graph optimization over the continuous-time cubic basis-spline trajectory 375 can be performed to minimize the following objective, with control poses in the welding window associated to $KMF_l$ fixed:

$$E_{PGO}(\{\xi_i^c\}) = E_{rel}(\{\xi_i^c\}) + E_{reg}(\{\xi_i^c\})$$

where $$E_{rel}(\{\xi_i^c\}) = \sum_{(\alpha,\beta)} \rho\left( \left\| e_{\alpha,\beta}^T(\{\xi_i^c\}) \right\|_{\Sigma_{\alpha,\beta}^{-1}}^2 \right)$$

with $e_{\alpha,\beta}(\{\xi_i^c\}) = \text{Log}(T_{\beta\alpha}(T_{wb}{}^c(t_\alpha))^{-1} T_{wb}{}^c(t_\beta)) \in \mathbb{R}^6$ sums over the relative pose errors of each edge weighted by an uncertainty term $\Sigma_{\alpha,\beta}^{-1}$, and $$E_{reg}(\{\xi_i^c\}) = \sum_{(i)} \rho\left( \left\| r_i^T(\{\xi_i^c\}) \right\|_{\Lambda_i^{-1}}^2 \right)$$

with $r_i^T(\{\xi_i^c\}) = \text{Log}(T_i^{-1} T_{wb}{}^c(\bar{t}_i)) \in \mathbb{R}^6$ is a unary regularization term weighted with uncertainty $\Lambda_i^{-1}$ to anchor al key multi-frame's representative pose at $T_i = T_{wb}{}^c(\bar{t}_i)$ evaluated before the optimization. The energy term is minimized with the Levenberg-Marquardt algorithm.

After PGO, the map points are updated with the adjusted poses. Next, matches between the candidate key multi-frame welding window and the query key multi-frame welding window are used to fuse reobserved map points that were re-triangulated in the current window. A local bundle adjustment over the two welding windows is subsequently performed to refine both map points and query window control poses while freezing the candidate window control poses in the optimization.

Figure 7:
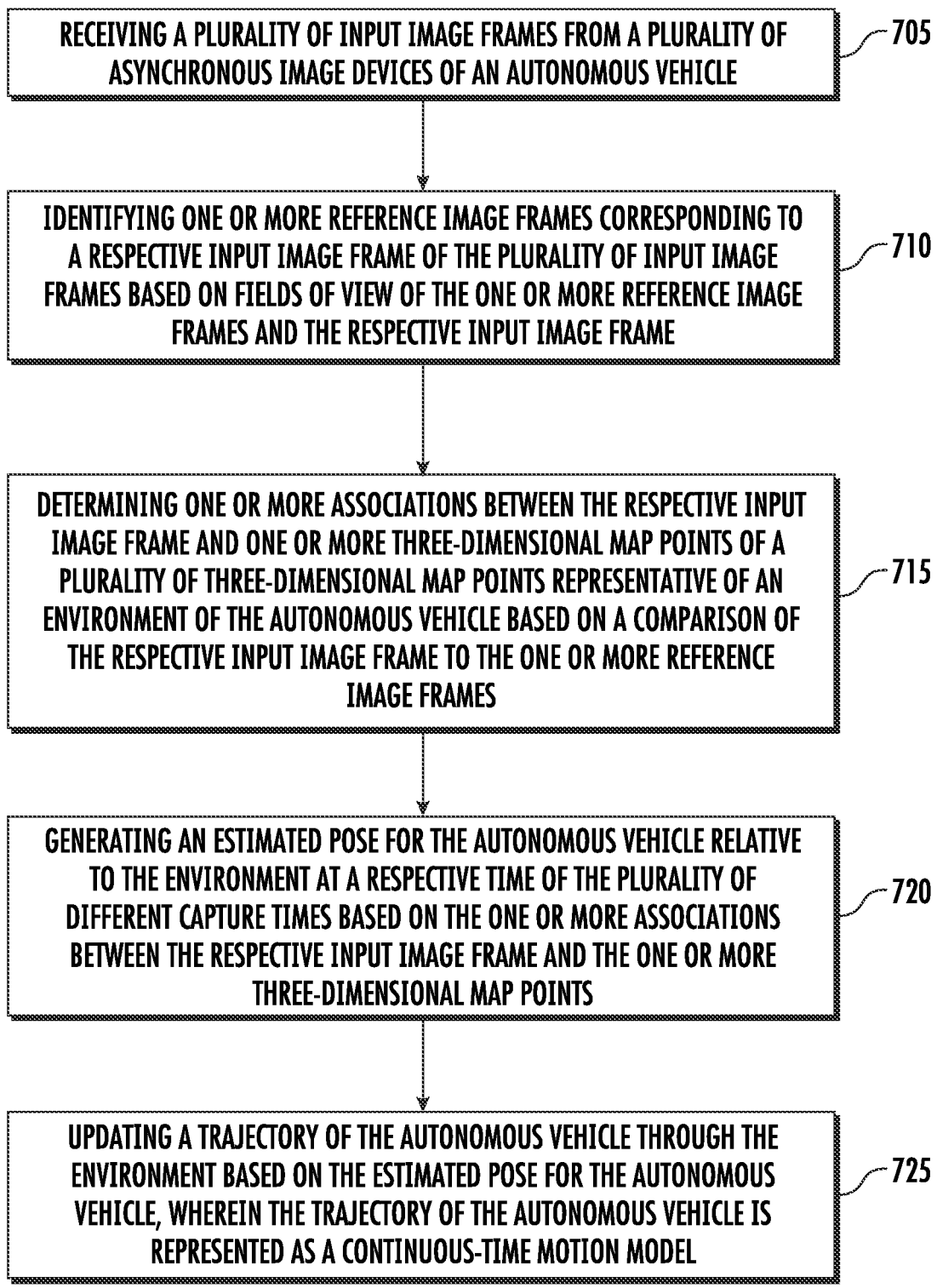
FIG. 7 is a flowchart of a method for the simultaneous localization and mapping of a robotic platform based on asynchronous image frames, according to some aspects of the present disclosure.

FIG. 7 is a flowchart of a method 700 for simultaneously localizing and mapping a robotic platform based on asynchronous image frames, according to some aspects of the present disclosure. The method 700 can be performed by a computing system that includes one or more computing devices such as, for example, the computing systems described with reference to the other figures (e.g., robotic platform 105, vehicle computing system 210, operations computing system(s) 290A, remote computing system(s) 290B, etc.). Each respective portion of the method 700 can be performed by any (or any combination) of one or more computing devices. Moreover, one or more portion(s) of the method 700 can be implemented as an algorithm on the hardware components of the device(s) described herein (e.g., as in FIGS. 1-4, 11, etc.), for example, to perform simultaneous localization and mapping of the robotic platform as discussed herein. FIG. 7 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 7 is described with reference to elements/terms described with respect to other systems and figures for exemplary illustrated purposes and is not meant to be limiting. One or more portions of method 800 can be performed additionally, or alternatively, by other systems.

At 705, the method 700 includes receiving a plurality of input image frames from a plurality of asynchronous image devices of an autonomous vehicle. For example, a computing system (e.g., robotic platform 105, vehicle computing system 210, operations computing system(s) 290A, remote computing system(s) 290B, etc.) can receive the plurality of input image frames from the plurality of asynchronous image devices of the autonomous vehicle. At least a subset of the plurality of input image frames may have different capture times.

At 710, the method 700 includes identifying one or more reference image frames corresponding to a respective input image frame of the plurality of input image frames based on fields of view of the one or more reference image frames and the respective input image frame. For example, the computing system can identify one or more reference image frames that at least partially overlap a field of view of a respective input image frame of the plurality of input image frames. The one or more reference image frames can be associated with one or more reference times preceding the plurality of different capture times.

At 715, the method 700 includes determining one or more associations between the respective input image frame and one or more three-dimensional map points of a plurality of three-dimensional map points representative of an environment of the autonomous vehicle based on a comparison of the respective input image frame to the one or more reference image frames. For example, the computing system can determine the one or more associations between the respective input image frame and the one or more three-dimensional map points of the plurality of three-dimensional map points representative of the environment of the autonomous vehicle based on the comparison of the respective input image frame to the one or more reference image frames.

At 720, the method 700 includes generating an estimated pose for the autonomous vehicle relative to the environment at a respective time of the plurality of different capture times based on the one or more associations between the respective input image frame and the one or more three-dimensional map points. For example, the computing system can generate the estimated pose for the autonomous vehicle relative to the environment at the respective time of the plurality of different capture times based on the one or more associations between the respective input image frame and the one or more three-dimensional map points.

In some implementations, at 725, the method 700 includes updating a trajectory of the autonomous vehicle through the environment based on the estimated pose for the autonomous vehicle. For example, the computing system can update the trajectory of the autonomous vehicle through the environment based on the estimated pose for the autonomous vehicle. The trajectory of the autonomous vehicle can be represented as a continuous-time motion model.

Figure 8:
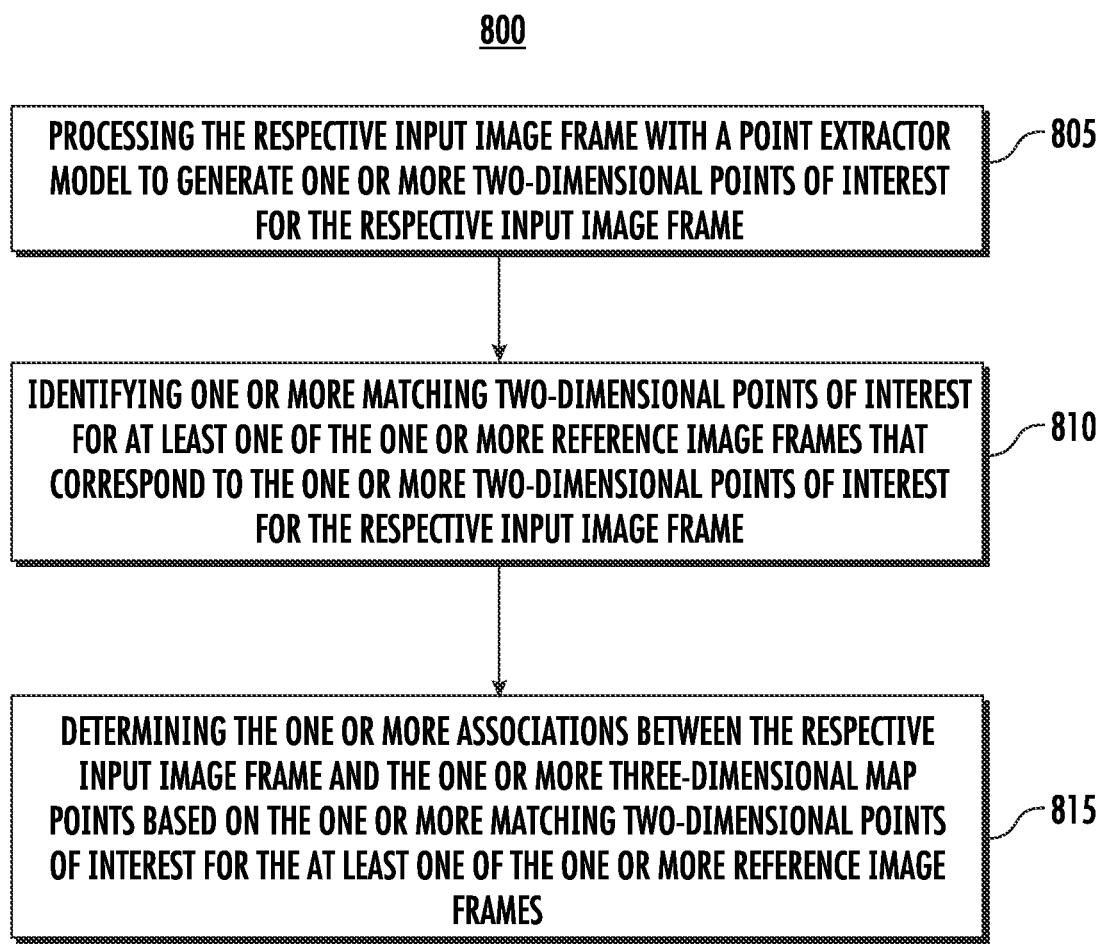
FIG. 8 is a flowchart of a method for determining associations with a three-dimensional environment, according to some aspects of the present disclosure.

FIG. 8 a flowchart of a method 800 for determining associations with a three-dimensional environment, according to some aspects of the present disclosure. One or more portion(s) of the method 800 can be implemented by a computing system that includes one or more computing devices such as, for example, the computing systems described with reference to the other figures (e.g., robotic platform 105, vehicle computing system 210, operations computing system(s) 290A, remote computing system(s) 290B, etc.). Each respective portion of the method 800 can be performed by any (or any combination) of one or more computing devices. Moreover, one or more portion(s) of the method 800 can be implemented as an algorithm on the hardware components of the device(s) described herein (e.g., as in FIGS. 1-4, 11, etc.), for example, to determine associations with a three-dimensional environment as discussed herein. FIG. 8 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 8 is described with reference to elements/terms described with respect to other systems and figures for exemplary illustrated purposes and is not meant to be limiting. One or more portions of method 800 can be performed additionally, or alternatively, by other systems.

The method 800 can include suboperations of operation 715 of FIG. 7 where the method 700 includes determining the one or more associations between the respective input image frame and the one or more three-dimensional map points of the plurality of three-dimensional map points representative of the environment of the autonomous vehicle based on the comparison of the respective input image frame to the one or more reference image frames.

At 805, the method 800 includes processing the respective input image frame with a point extractor model to generate one or more two-dimensional points of interest for the respective input image frame. For example, a computing system (e.g., robotic platform 105, vehicle computing system 210, operations computing system(s) 290A, remote computing system(s) 290B, etc.) can process the respective input image frame with the point extractor model to generate the one or more two-dimensional points of interest for the respective input image frame.

At 810, the method 800 includes identifying one or more matching two-dimensional points of interest for at least one of the one or more reference image frames that correspond to the one or more two-dimensional points of interest for the respective input image frame. For example, the computing system can identify the one or more matching two-dimensional points of interest for the at least one of the one or more reference image frames that correspond to the one or more two-dimensional points of interest for the respective input image frame.

At 815, the method 900 includes determining the one or more associations between the respective input image frame and the one or more three-dimensional map points based on the one or more matching two-dimensional points of interest for the at least one of the one or more reference image frames. For example, the computing system can determine the one or more associations between the respective input image frame and the one or more three-dimensional map points based on the one or more matching two-dimensional points of interest for the at least one of the one or more reference image frames.

Figure 9:
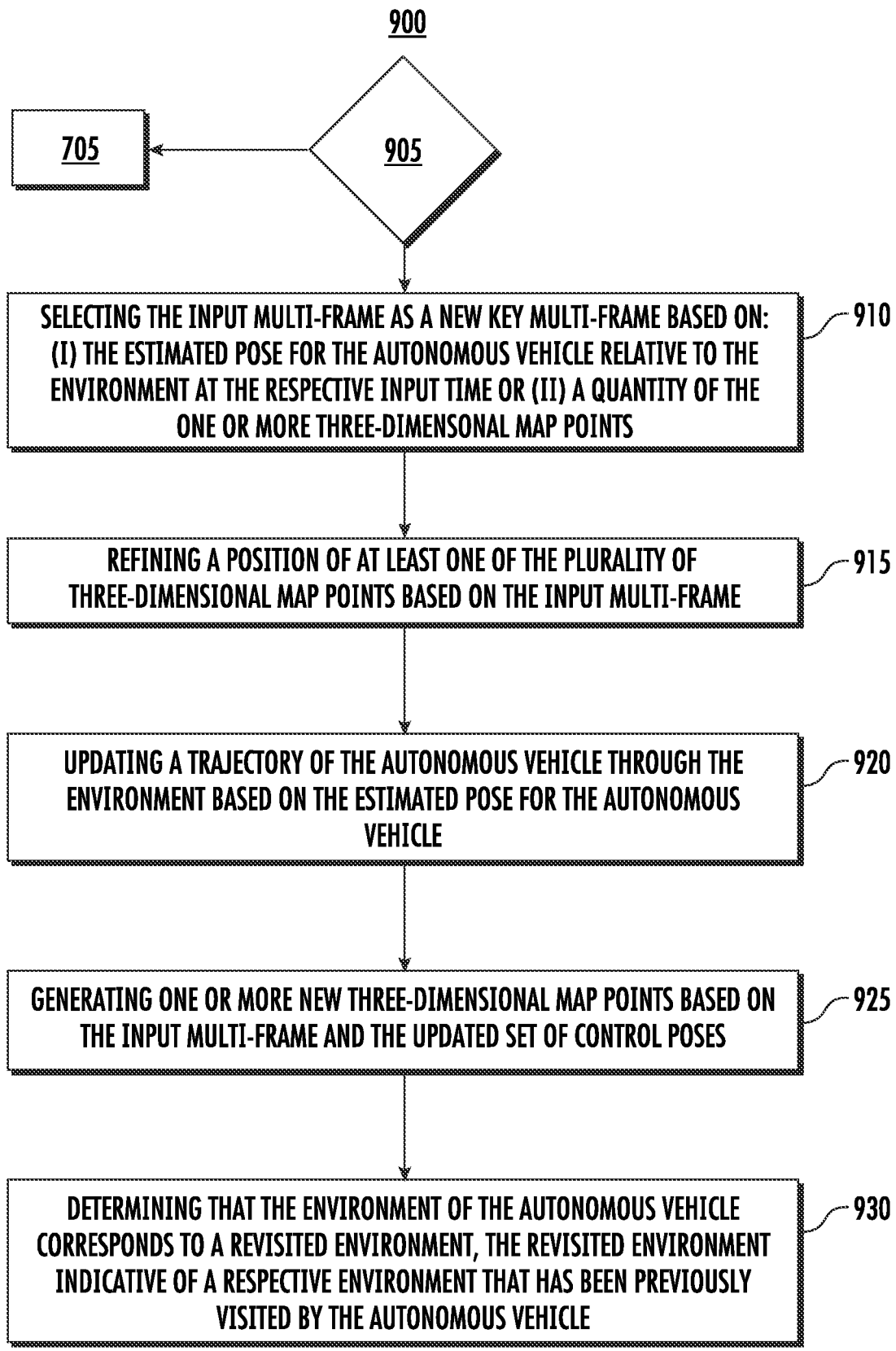
FIG. 9 is a flowchart of a method for updating a trajectory of a robotic platform based on an estimated pose for the robotic platform, according to some aspects of the present disclosure.

FIG. 9 is a flowchart of a method 900 for updating a trajectory of a robotic platform based on an estimated pose for the robotic platform, according to some aspects of the present disclosure. One or more portion(s) of the method 900 can be implemented by a computing system that includes one or more computing devices such as, for example, the computing systems described with reference to the other figures (e.g., robotic platform 105, vehicle computing system 210, operations computing system(s) 290A, remote computing system(s) 290B, etc.). Each respective portion of the method 900 can be performed by any (or any combination) of one or more computing devices. Moreover, one or more portion(s) of the method 900 can be implemented as an algorithm on the hardware components of the device(s) described herein (e.g., as in FIGS. 1-4, 11, etc.), for example, to update a trajectory of a robotic platform based on an estimated pose for the robotic platform as discussed herein. FIG. 9 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 9 is described with reference to elements/terms described with respect to other systems and figures for exemplary illustrated purposes and is not meant to be limiting. One or more portions of method 800 can be performed additionally, or alternatively, by other systems.

The method 900 can include portions and/or suboperations of operation 725 of FIG. 7 where, in some implementations, the method 700 includes updating a trajectory of the autonomous vehicle through the environment based on the estimated pose for the autonomous vehicle.

At 905, the method 900 includes determining whether to select the input multi-frame as a new key multi-frame. For example, a computing system (e.g., robotic platform 105, vehicle computing system 210, operations computing system(s) 290A, remote computing system(s) 290B, etc.) can determine whether to select the input multi-frame as the new key multi-frame, as described herein. In the event that the input multi-frame is selected, the method 900 can proceed to step 910. In the event that the input multi-frame is not selected, the method 900 can proceed to step 705 of method 700 where another set of a plurality of input image frames from a plurality of asynchronous image devices of an autonomous vehicle can be received.

At 910, the method 900 includes selecting the input multi-frame as a new key multi-frame based on: (i) the estimated pose for the autonomous vehicle relative to the environment at the respective input time or (ii) a quantity of the one or more three-dimensional map points. For example, the computing system can select the input multi-frame as the new key multi-frame based on: (i) the estimated pose for the autonomous vehicle relative to the environment at the respective input time or (ii) the quantity of the one or more three-dimensional map points.

At 915, the method 900 includes refining a position of at least one of the plurality of three-dimensional map points based on the input multi-frame. For example, the computing system can refine the position of the at least one of the plurality of three-dimensional map points based on the input multi-frame.

At 920, the method 900 includes updating a trajectory of the autonomous vehicle through the environment based on the estimated pose for the autonomous vehicle. For example, the computing system can update the trajectory of the autonomous vehicle through the environment based on the estimated pose for the autonomous vehicle.

At 925, the method 900 includes generating one or more new three-dimensional map points based on the input multi-frame and the updated set of control poses. For example, the computing system can generate the one or more new three-dimensional map points based on the input multi-frame and the updated set of control poses.

At 930, the method 900 includes determining that the environment of the autonomous vehicle corresponds to a revisited environment. For example, the computing system can determine that the environment of the autonomous vehicle corresponds to the revisited environment. The revisited environment can be indicative of a respective environment that has been previously visited by the autonomous vehicle.

Figure 10:
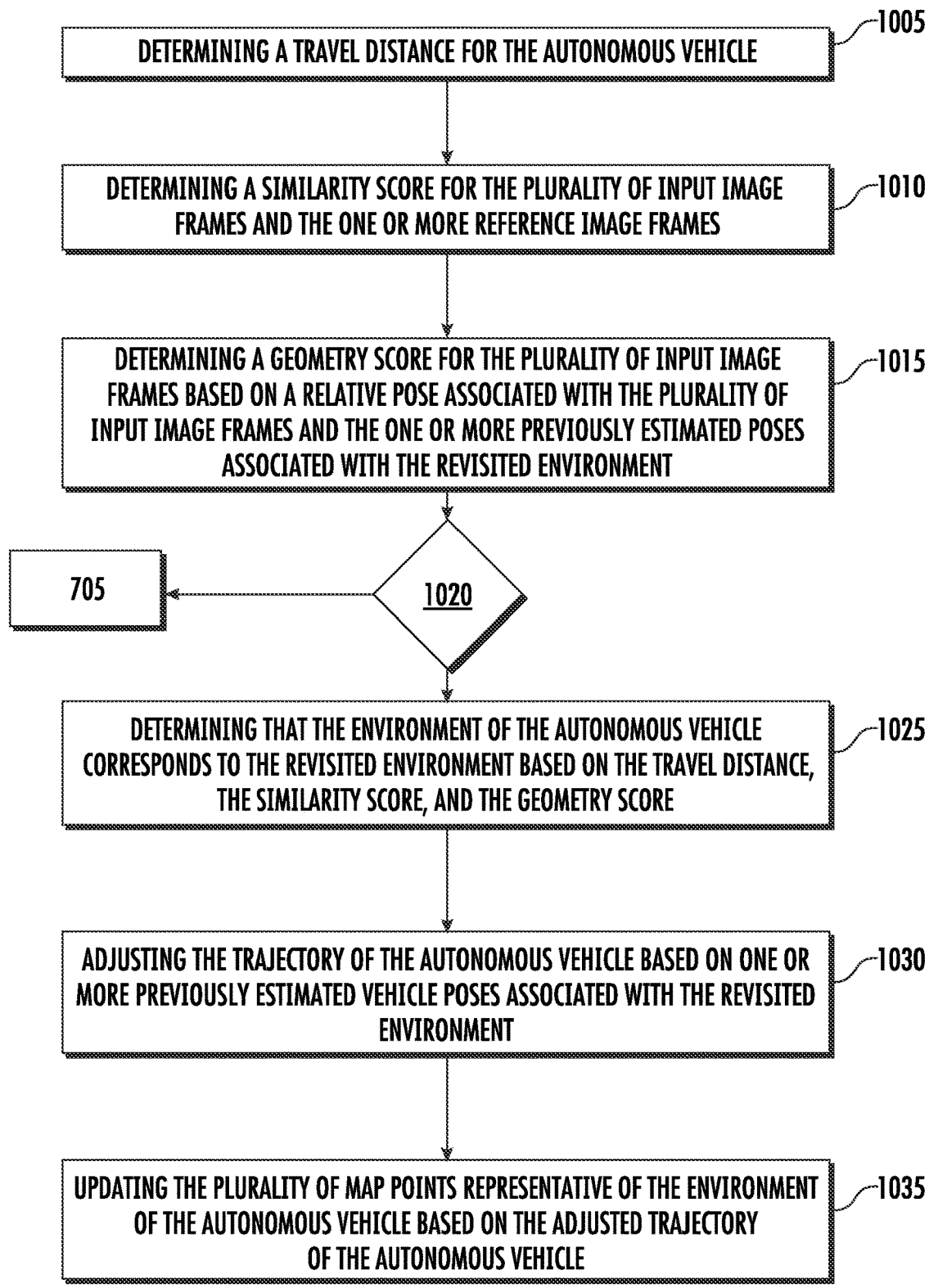
FIG. 10 is a flowchart of method for adjusting a trajectory of a robotic platform based on previously estimated poses associated with a revisited environment, according to some aspects of the present disclosure.

FIG. 10 is a flowchart of method 1000 for adjusting a trajectory of a robotic platform based on previously estimated poses associated with a revisited environment, according to some aspects of the present disclosure. One or more portion(s) of the method 1000 can be implemented by a computing system that includes one or more computing devices such as, for example, the computing systems described with reference to the other figures (e.g., robotic platform 105, vehicle computing system 210, operations computing system(s) 290A, remote computing system(s) 290B, etc.). Each respective portion of the method 1000 can be performed by any (or any combination) of one or more computing devices. Moreover, one or more portion(s) of the method 1000 can be implemented as an algorithm on the hardware components of the device(s) described herein (e.g., as in FIGS. 1-4, 11, etc.), for example, to adjust a trajectory of a robotic platform based on previously estimated poses associated with a revisited environment as discussed herein. FIG. 10 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 10 is described with reference to elements/terms described with respect to other systems and figures for exemplary illustrated purposes and is not meant to be limiting. One or more portions of method 1000 can be performed additionally, or alternatively, by other systems.

The method 1000 can include portions and/or suboperations of operation 930 of FIG. 9 where, in some implementations, the method 900 includes determining that the environment of the autonomous vehicle corresponds to the revisited environment.

At 1005, the method 1000 includes determining a travel distance for the autonomous vehicle. For example, a computing system (e.g., robotic platform 105, vehicle computing system 210, operations computing system(s) 290A, remote computing system(s) 290B, etc.) can determine the travel distance for the autonomous vehicle.

At 1010, the method 1000 includes determining a similarity score for the plurality of input image frames and the one or more reference image frames. For example, the computing system can determine the similarity score for the plurality of input image frames and the one or more reference image frames.

At 1015, the method 1000 includes determining a geometry score for the plurality of input image frames based on a relative pose associated with the plurality of input image frames and the one or more previously estimated poses associated with the revisited environment. For example, the computing system can determine the geometry score for the plurality of input image frames based on the relative pose associated with the plurality of input image frames and the one or more previously estimated poses associated with the revisited environment.

At 1020, the method 1000 includes determining whether the environment of the autonomous vehicle corresponds to the revisited environment based on the travel distance, the similarity score, and the geometry score. For example, the computing system can determine whether the environment of the autonomous vehicle corresponds to the revisited environment based on the travel distance, the similarity score, and the geometry score. In the event that the environment of the autonomous vehicle corresponds to the revisited environment, the method 1000 can proceed to step 1025. In the event that the environment of the autonomous vehicle does not correspond to the revisited environment, the method 1000 can proceed to step 705 of method 700 where another set of a plurality of input image frames from a plurality of asynchronous image devices of an autonomous vehicle can be received.

At 1025, the method 1000 includes determining that the environment of the autonomous vehicle corresponds to the revisited environment based on the travel distance, the similarity score, and the geometry score. For example, the computing system can determine that the environment of the autonomous vehicle corresponds to the revisited environment based on the travel distance, the similarity score, and the geometry score.

At 1030, the method 1000 includes adjusting the trajectory of the autonomous vehicle based on one or more previously estimated vehicle poses associated with the revisited environment. For example, the computing system can adjust the trajectory of the autonomous vehicle based on one or more previously estimated vehicle poses associated with the revisited environment.

At 1035, the method 1000 includes updating the plurality of map points representative of the environment of the autonomous vehicle based on the adjusted trajectory of the autonomous vehicle. For example, the computing system can update the plurality of map points representative of the environment of the autonomous vehicle based on the adjusted trajectory of the autonomous vehicle.

Figure 11:
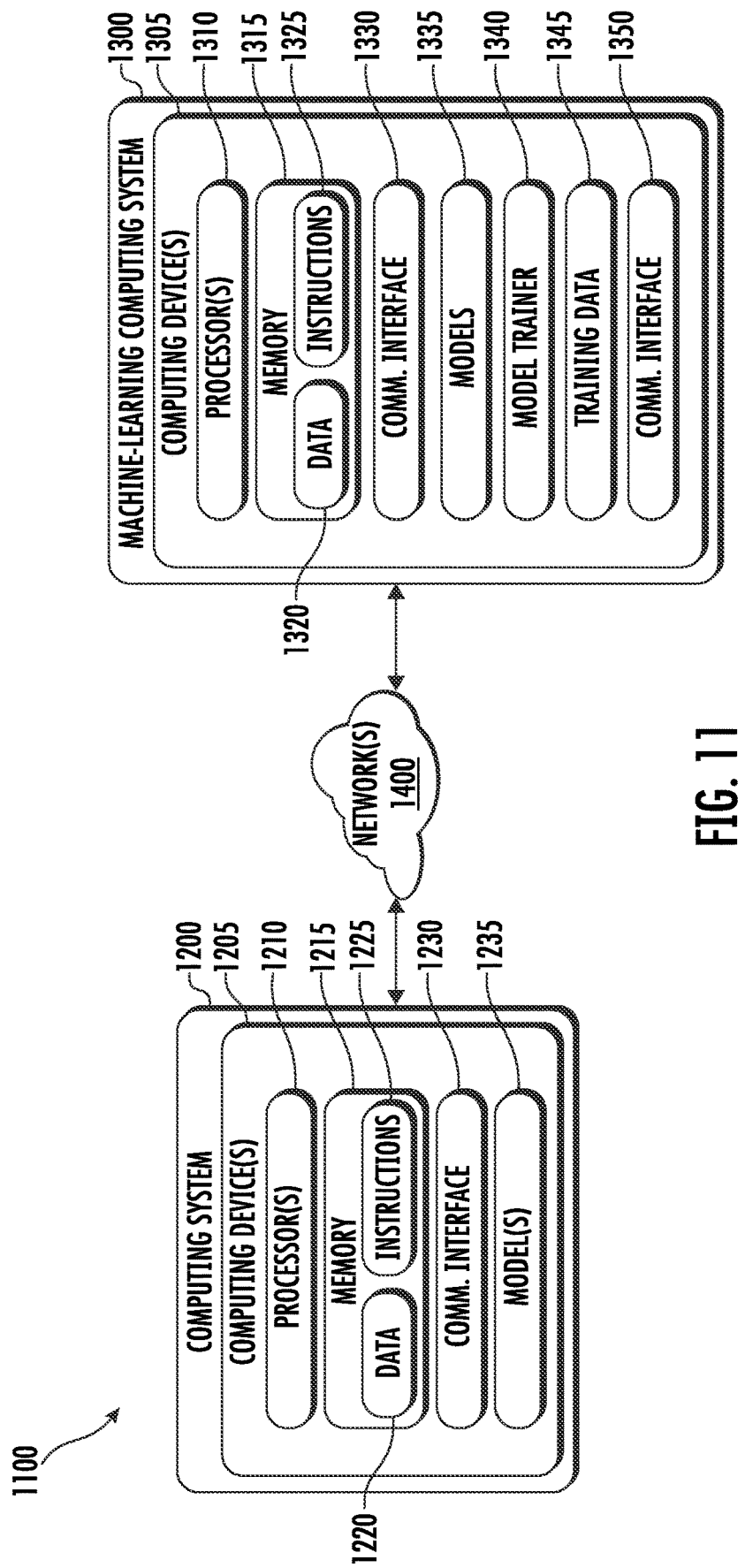
FIG. 11 is a block diagram of a computing system, according to some embodiments of the present disclosure.

FIG. 11 is a block diagram of an example computing system 1100, according to some embodiments of the present disclosure. The example system 1100 includes a computing system 1200 and a machine-learning computing system 1300 that are communicatively coupled over one or more networks 1400.

In some implementations, the computing system 1200 can perform one or more observation tasks such as, for example, by obtaining sensor data (e.g., two-dimensional, three-dimensional, etc.) associated with a dynamic object. In some implementations, the computing system 1200 can be included in a robotic platform. For example, the computing system 1200 can be on-board an autonomous vehicle. In other implementations, the computing system 1200 is not located on-board a robotic platform. The computing system 1200 can include one or more distinct physical computing devices 1205.

The computing system 1200 (or one or more computing device(s) 1205 thereof) can include one or more processors 1210 and a memory 1215. The one or more processors 1210 can be any suitable processing device (e.g., a processor core, a microprocessor, an ASIC, a FPGA, a controller, a microcontroller, etc.) and can be one processor or a plurality of processors that are operatively connected. The memory 1215 can include one or more non-transitory computer-readable storage media, such as RAM, ROM, EEPROM, EPROM, one or more memory devices, flash memory devices, etc., and combinations thereof.

The memory 1215 can store information that can be accessed by the one or more processors 1210. For instance, the memory 1215 (e.g., one or more non-transitory computer-readable storage mediums, memory devices) can store data 1220 that can be obtained, received, accessed, written, manipulated, created, or stored. The data 1220 can include, for instance, sensor data (e.g., synchronous image frames, asynchronous image frames, etc.), two-dimensional data, three-dimensional data, image data, LiDAR data, or any other data or information described herein. In some implementations, the computing system 1200 can obtain data from one or more memory device(s) that are remote from the computing system 1200.

The memory 1215 can also store computer-readable instructions 1225 that can be executed by the one or more processors 1210. The instructions 1225 can be software written in any suitable programming language or can be implemented in hardware. Additionally, or alternatively, the instructions 1225 can be executed in logically or virtually separate threads on processor(s) 1210.

For example, the memory 1215 can store instructions 1225 that when executed by the one or more processors 1210 cause the one or more processors 1210 (the computing system 1200) to perform any of the operations, functions, or methods/processes described herein, including, for example, the simultaneous localization and mapping of a robotic platform, etc.

According to an aspect of the present disclosure, the computing system 1200 can store or include one or more machine-learned models 1235. As examples, the machine-learned models 1235 can be or can otherwise include various machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks.

In some implementations, the computing system 1200 can receive the one or more machine-learned models 1235 from the machine-learning computing system 1300 over network(s) 1400 and can store the one or more machine-learned models 1235 in the memory 1215. The computing system 1200 can then use or otherwise implement the one or more machine-learned models 1235 (e.g., by processor(s)

1210). In particular, the computing system 1200 can implement the machine-learned model(s) 1235 to determine associated with a three-dimensional environment, generate and/or refine a continuous-time motion trajectory and/or a plurality of three-dimensional map points, etc.

The machine learning computing system 1300 can include one or more computing devices 1305. The machine learning computing system 1300 can include one or more processors 1310 and a memory 1315. The one or more processors 1310 can be any suitable processing device (e.g., a processor core, a microprocessor, an ASIC, a FPGA, a controller, a microcontroller, etc.) and can be one processor or a plurality of processors that are operatively connected. The memory 1315 can include one or more non-transitory computer-readable storage media, such as RAM, ROM, EEPROM, EPROM, one or more memory devices, flash memory devices, etc., and combinations thereof.

The memory 1315 can store information that can be accessed by the one or more processors 1310. For instance, the memory 1315 (e.g., one or more non-transitory computer-readable storage mediums, memory devices) can store data 1320 that can be obtained, received, accessed, written, manipulated, created, or stored. The data 1320 can include, for instance, sensor data, two-dimensional data, three-dimensional, image data, LiDAR data, object model parameters, simulation data, data associated with models, or any other data or information described herein. In some implementations, the machine learning computing system 1300 can obtain data from one or more memory device(s) that are remote from the machine learning computing system 1300.

The memory 1315 can also store computer-readable instructions 1325 that can be executed by the one or more processors 1310. The instructions 1325 can be software written in any suitable programming language or can be implemented in hardware. Additionally, or alternatively, the instructions 1325 can be executed in logically or virtually separate threads on processor(s) 1310.

For example, the memory 1315 can store instructions 1325 that when executed by the one or more processors 1310 cause the one or more processors 1310 (the computing system) to perform any of the operations or functions described herein, including, for example, training a machine-learned object parameter estimation model, generating simulation data, etc.

In some implementations, the machine learning computing system 1300 includes one or more server computing devices. If the machine learning computing system 1300 includes multiple server computing devices, such server computing devices can operate according to various computing architectures, including, for example, sequential computing architectures, parallel computing architectures, or some combination thereof.

In addition, or alternatively to the model(s) 1235 at the computing system 1200, the machine learning computing system 1300 can include one or more machine-learned models 1335. As examples, the machine-learned models 1335 can be or can otherwise include various machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks.

In some implementations, the machine learning computing system 1300 or the computing system 1200 can train the machine-learned models 1235 or 1335 through use of a model trainer 1340. The model trainer 1340 can train the machine-learned models 1235 or 1335 using one or more training or learning algorithms. One example training technique is backwards propagation of errors. In some implementations, the model trainer 1340 can perform supervised training techniques using a set of labeled training data. In other implementations, the model trainer 1340 can perform unsupervised training techniques using a set of unlabeled training data. By way of example, the model trainer 1340 can train the machine-learned object parameter estimation model through unsupervised energy minimization training techniques using the objective function described herein. The model trainer 1340 can perform a number of generalization techniques to improve the generalization capability of the models being trained. Generalization techniques include weight decays, dropouts, or other techniques.

The computing system 1200 and the machine learning computing system 1300 can each include a communication interface 1230 and 1350, respectively. The communication interfaces 1230/1350 can be used to communicate with one or more systems or devices, including systems or devices that are remotely located from the computing system 1200 and the machine learning computing system 1300. A communication interface 1230/1350 can include any circuits, components, software, etc. for communicating with one or more networks (e.g., 1400). In some implementations, a communication interface 1230/1350 can include, for example, one or more of a communications controller, receiver, transceiver, transmitter, port, conductors, software or hardware for communicating data.

The network(s) 1400 can be any type of network or combination of networks that allows for communication between devices. In some embodiments, the network(s) can include one or more of a local area network, wide area network, the Internet, secure network, cellular network, mesh network, peer-to-peer communication link or some combination thereof and can include any number of wired or wireless links. Communication over the network(s) 1400 can be accomplished, for instance, through a network interface using any type of protocol, protection scheme, encoding, format, packaging, etc.

FIG. 11 illustrates one example system 1100 that can be used to implement the present disclosure. Other systems can be used as well. For example, in some implementations, the computing system 1200 can include the model trainer 1340 and the training dataset 1345. In such implementations, the machine-learned models 1335 can be both trained and used locally at the computing system 1200. As another example, in some implementations, the computing system 1200 is not connected to other computing systems.

The training dataset 1345, for example, can include a simultaneous localization and mapping (SLAM) dataset that features multiple asynchronous image devices (e.g., such as image device(s) 415A-E of FIG. 4B). For instance, the training dataset 1345 can include a large-scale asynchronous multi-view SLAM dataset recorded using a fleet of autonomous vehicles in one or more geographic locations over a span of time.

Each vehicle (e.g., vehicle 205 of FIG. 2) can be equipped with multiple sensors including image devices, wheel encoders, inertial measurement units ("IMU"), a consumer-grade global positioning system ("GPS") receivers, and light detection and ranging systems (e.g., Velodyne HDL-64e LiDAR, etc.). LiDAR data collected by the light detection and ranging systems can be used to compute the ground-truth pose information and are not part of the training dataset 1345. The image device setup includes five wide-angle cameras spanning the vehicle's surroundings and an additional forward-facing stereo pair. Intrinsic and extrinsic calibration parameters are computed in advance using a set of checkerboard calibration patterns. Image frames are rectified to a pinhole camera model.

The image devices have a red, green, blue ("RGB") resolution of 1920×1200 pixels and use a global shutter. The five wide-angle image devices are hardware triggered in sync with the rotating LiDAR at an average frequency of 10 Hz, firing asynchronously with respect to each other. The training dataset 1345 contains 116 sequences spanning 482 km and 21h of driving. The driven distance and area coverage are substantially larger than previous large-scale HD datasets. All sequences are recorded during daytime or twilight and the duration of a sequence ranges from 4 to 18 minutes, with a wide variety of scenarios including (1) diverse environments from busy downtown streets to residential areas, low-textured scenes with bridges, highways, and rural areas; (2) diverse weather ranging from sunny days to heavy precipitation; (3) diverse motions with varying speed (highway driving, urban traffic, intersections, parking lots), trajectory loops, and maneuvers including U-turns and reversing.

The training dataset 1345 can be split geographically into train, validation, and test partitions. The ground-truth poses can be obtained using an offline high definition map-based global optimization leveraging IMU, wheel encoders, GPS, and LiDAR. The maps are built with LiDAR from multiple runs through the same area, ensuring ground-truth accuracy within 25 cm.

The training dataset 1345 can improve the geographic diversity, modern sensor layouts, and scale provided by previous datasets. Unlike previous datasets, the training dataset 1345 has been selected using a semi-automatic curation process to ensure all splits cover similar categories of environments, while at the same time having substantial appearance differences between the splits. The image devices are all RGB and have a resolution of 1920×1200 pixels, a global shutter, and the (asynchronous) shutter timestamps are recorded with the rest of the data. The wide-angle and narrow-angle cameras have rectified fields of view ("FoVs") of 76.6°×52.6° and 37.8°×24.2°, respectively. Furthermore, the 6-degrees of freedom ("DoF") ground-truth is generated using an offline high definition-map based localization system, which enables SLAM systems to be evaluated at the centimeter level.

In addition, components illustrated or discussed as being included in one of the computing systems 1200 or 1300 can instead be included in another of the computing systems 1200 or 1300. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Lists joined by a particular conjunction such as "or," for example, can refer to "at least one of" or "any combination of" example elements listed therein.

What is claimed is:

1. A computer-implemented method, the method comprising:
   (a) receiving a plurality of input image frames from a plurality of asynchronous image devices of an autonomous vehicle, wherein at least a subset of the plurality of input image frames have a plurality of different capture times;
   (b) identifying one or more reference image frames that at least partially overlap a field of view of a respective input image frame of the plurality of input image frames, wherein the one or more reference image frames are associated with one or more reference times preceding the plurality of different capture times;
   (c) determining one or more associations between the respective input image frame and one or more three-dimensional map points of a plurality of three-dimensional map points representative of an environment of the autonomous vehicle based on a comparison of the respective input image frame to the one or more reference image frames;
   (d) generating an estimated pose for the autonomous vehicle relative to the environment at a respective time of the plurality of different capture times based on the one or more associations between the respective input image frame and the one or more three-dimensional map points; and
   (e) updating a trajectory of the autonomous vehicle through the environment based on the estimated pose for the autonomous vehicle, wherein the trajectory of the autonomous vehicle is represented as a continuous-time motion model;
   wherein (i) the plurality of three-dimensional map points and (ii) the continuous-time motion model are previously generated based on the one or more reference image frames.

2. The computer-implemented method of claim 1, wherein (c) comprises:
   processing the respective input image frame with a point extractor model to generate one or more two-dimensional points of interest for the respective input image frame;
   identifying one or more matching two-dimensional points of interest for at least one of the one or more reference image frames that correspond to the one or more two-dimensional points of interest for the respective input image frame; and
   determining the one or more associations between the respective input image frame and the one or more three-dimensional map points based on the one or more matching two-dimensional points of interest for the at least one of the one or more reference image frames.

3. The computer-implemented method of claim 1, wherein the plurality of input image frames correspond to an input multi-frame of a plurality of multi-frames received by the autonomous vehicle during an operational time period, wherein the plurality of multi-frames comprise one or more key multi-frames, and wherein (i) the plurality of three-dimensional map points and (ii) the continuous-time motion model are previously generated based on the one or more key multi-frames.

4. The computer-implemented method of claim 3, wherein the one or more key multi-frames are associated with one or more key times preceding the plurality of different capture times, and wherein the one or more reference image frames correspond to a recent key multi-frame associated with a recent key time of the one or more key times that is closest in time to the plurality of different capture times.

5. The computer-implemented method of claim 3, wherein (e) further comprises:
   selecting the input multi-frame as a new key multi-frame based on: (i) the estimated pose for the autonomous vehicle relative to the environment at the respective input time or (ii) a quantity of the one or more three-dimensional map points; and
   in response to selecting the input multi-frame as the new key multi-frame, updating the trajectory of the autonomous vehicle through the environment based on the input multi-frame.

6. The computer-implemented method of claim 5, wherein (e) further comprises:
   in response to selecting the input multi-frame as the new key multi-frame, refining a position of at least one of the plurality of three-dimensional map points based on the input multi-frame.

7. The computer-implemented method of claim 5, wherein the continuous-time motion model comprises a cumulative cubic basis spline parameterized by a set of control poses, and wherein (e) comprises:
   updating the set of control poses based on the input multi-frame and one or more previous estimated poses corresponding to the one or more key multi-frames.

8. The computer-implemented method of claim 7, wherein updating the set of control poses based on the input multi-frame and the one or more previous estimated poses corresponding to the one or more key multi-frames comprises:
   refining at least one of the one or more previous poses corresponding to the one or more key multi-frames based on the input multi-frame.

9. The computer-implemented method of claim 7, wherein (e) further comprises:
   in response to selecting the input multi-frame as the new key multi-frame, generating one or more new three-dimensional map points based on the input multi-frame and the updated set of control poses.

10. The computer-implemented method of claim 9, wherein the one or more new three-dimensional map points are generated based on a comparison between (i) at least two input images frames of the plurality of input image frames or (ii) at least one input image frame and at least one key image frame of at least one of the one or more key multi-frames.

11. The computer-implemented method of claim 1, wherein (d) comprises:
   generating the estimated pose for the autonomous vehicle relative to the environment at the respective time of the plurality of different capture times based on a continuous-time linear motion model and a previously estimated pose corresponding to the one or more reference image frames.

12. The computer-implemented method of claim 1, further comprising:
   (f) determining that the environment of the autonomous vehicle corresponds to a revisited environment, the revisited environment indicative of a respective environment that has been previously visited by the autonomous vehicle; and
   (g) in response to determining that the environment of the autonomous vehicle corresponds to the revisited environment:
      (i) adjusting the trajectory of the autonomous vehicle based on one or more previously estimated vehicle poses associated with the revisited environment, and
      (ii) updating the plurality of map points representative of the environment of the autonomous vehicle based on the adjusted trajectory of the autonomous vehicle.

13. The computer-implemented method of claim 12, wherein (f) comprises:
   determining a travel distance for the autonomous vehicle;
   determining a similarity score for the plurality of input image frames and the one or more reference image frames;
   determining a geometry score for the plurality of input image frames based on a relative pose associated with the plurality of input image frames and the one or more previously estimated poses associated with the revisited environment; and
   determining that the environment of the autonomous vehicle corresponds to the revisited environment based on the travel distance, the similarity score, and the geometry score.

14. The computer-implemented method of claim 1, wherein the plurality of asynchronous image devices of the autonomous vehicle are associated with a plurality of different fields of view.

15. An autonomous vehicle control system comprising:
   one or more processors; and
   one or more computer-readable medium storing instructions that when executed by the one or more processors cause the autonomous vehicle control system to perform operations, the operations comprising:
      (a) receiving a plurality of input image frames from a plurality of asynchronous image devices of an autonomous vehicle, wherein at least a subset of the plurality of input image frames have a plurality of different capture times;
      (b) identifying one or more reference image frames that at least partially overlap a field of view of a respective input image frame of the plurality of input image frames, wherein the one or more reference image frames are associated with one or more reference times preceding the plurality of different capture times;
      (c) determining one or more associations between the respective input image frame and one or more three-dimensional map points of a plurality of three-dimensional map points representative of an environment of the autonomous vehicle based on a comparison of the respective input image frame to the one or more reference image frames; and
      (d) generating an estimated pose for the autonomous vehicle relative to the environment at a respective time of the plurality of different capture times based on the one or more associations between the respective input image frame and the one or more three-dimensional map points;
(e) updating a trajectory of the autonomous vehicle through the environment based on the estimated pose for the autonomous vehicle, wherein the trajectory of the autonomous vehicle is represented as a continuous-time motion model; and
wherein (i) the plurality of three-dimensional map points and (ii) the continuous-time motion model are previously generated based on the one or more reference image frames.

16. An autonomous vehicle comprising:
a plurality of asynchronous image devices configured to capture a plurality of image frames at a plurality of asynchronous times from a plurality of different views;
one or more processors; and
one or more computer-readable medium storing instructions that when executed by the one or more processors cause the autonomous vehicle to perform operations, the operations comprising:
(a) receiving a plurality of input image frames from the plurality of asynchronous image devices, wherein at least a subset of the plurality of input image frames have a plurality of different capture times;
(b) identifying one or more reference image frames that at least partially overlap a field of view of a respective input image frame of the plurality of input image frames, wherein the one or more reference image frames are associated with one or more reference times preceding the plurality of different capture times;
(c) determining one or more associations between the respective input image frame and one or more three-dimensional map points of a plurality of three-dimensional map points representative of an environment of the autonomous vehicle based on a comparison of the respective input image frame to the one or more reference image frames;
(d) generating an estimated pose for the autonomous vehicle relative to the environment at a respective time of the plurality of different capture times based on the one or more associations between the respective input image frame and the one or more three-dimensional map points; and
(e) updating a trajectory of the autonomous vehicle through the environment based on the estimated pose for the autonomous vehicle, wherein the trajectory of the autonomous vehicle is represented as a continuous-time motion model;
wherein (i) the plurality of three-dimensional map points and (ii) the continuous-time motion model are previously generated based on the one or more reference image frames.

17. The autonomous vehicle of claim 16, further comprising a light detection and ranging system, wherein at least one of the plurality asynchronous image devices is synchronized with the light detection and ranging system.

18. The autonomous vehicle control system of claim 15, wherein the plurality of input image frames correspond to an input multi-frame of a plurality of multi-frames received by the autonomous vehicle during an operational time period, wherein the plurality of multi-frames comprise one or more key multi-frames, and wherein (i) the plurality of three-dimensional map points and (ii) the continuous-time motion model are previously generated based on the one or more key multi-frames.

19. The autonomous vehicle control system of claim 15, the operations further comprising:
(f) determining that the environment of the autonomous vehicle corresponds to a revisited environment, the revisited environment indicative of a respective environment that has been previously visited by the autonomous vehicle; and
(g) in response to determining that the environment of the autonomous vehicle corresponds to the revisited environment:
(i) adjusting the trajectory of the autonomous vehicle based on one or more previously estimated vehicle poses associated with the revisited environment, and
(ii) updating the plurality of map points representative of the environment of the autonomous vehicle based on the adjusted trajectory of the autonomous vehicle.

20. The autonomous vehicle of claim 16, wherein the plurality of input image frames correspond to an input multi-frame of a plurality of multi-frames received by the autonomous vehicle during an operational time period, wherein the plurality of multi-frames comprise one or more key multi-frames, and wherein (i) the plurality of three-dimensional map points and (ii) the continuous-time motion model are previously generated based on the one or more key multi-frames.

* * * * *